United States Patent
Kato et al.

(10) Patent No.: US 8,214,189 B2
(45) Date of Patent: Jul. 3, 2012

(54) PERFORMANCE EVALUATION SIMULATION

(75) Inventors: Tomoki Kato, Kawasaki (JP);
Nobukazu Koizumi, Kawasaki (JP);
Noriyasu Nakayama, Kawasaki (JP);
Naoki Yuzawa, Kawasaki (JP);
Hiroyuki Hieda, Kawasaki (JP); Satoshi Hiramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 12/314,334

(22) Filed: Dec. 8, 2008

(65) Prior Publication Data
US 2009/0204380 A1 Aug. 13, 2009

(30) Foreign Application Priority Data
Jan. 8, 2008 (JP) .................. 2008-001606

(51) Int. Cl.
*G06F 17/50* (2006.01)
*G06F 9/45* (2006.01)
*G06G 7/62* (2006.01)
(52) U.S. Cl. .......................... 703/13; 703/22
(58) Field of Classification Search .............. 703/13, 703/22
See application file for complete search history.

(56) References Cited

U.S. PATENT DOCUMENTS

| | | | |
|---|---|---|---|
| 6,513,146 B1 * | 1/2003 | Yonezawa et al. | 716/103 |
| 7,366,647 B2 | 4/2008 | Araya et al. | |
| 2002/0022942 A1 | 2/2002 | Nakamura | |
| 2002/0066082 A1 * | 5/2002 | Araya et al. | 717/135 |
| 2002/0129329 A1 | 9/2002 | Nishioka et al. | |
| 2003/0121010 A1 | 6/2003 | Aubury | |
| 2005/0256692 A1 | 11/2005 | Monin et al. | |
| 2005/0261884 A1 | 11/2005 | Sakamoto et al. | |
| 2007/0271080 A1 | 11/2007 | Tatsuoka et al. | |
| 2008/0306721 A1 | 12/2008 | Yang | |
| 2009/0150136 A1 | 6/2009 | Yang | |
| 2009/0204380 A1 | 8/2009 | Kato et al. | |
| 2009/0313001 A1 * | 12/2009 | Kato et al. | 703/15 |
| 2010/0204975 A1 | 8/2010 | Nakayama et al. | |
| 2011/0184713 A1 | 7/2011 | Yang | |

FOREIGN PATENT DOCUMENTS

| | | |
|---|---|---|
| JP | 05-158740 | 6/1993 |
| JP | 11-259552 | 9/1999 |
| JP | 11-259553 | 9/1999 |
| JP | 2001-142927 | 5/2001 |
| JP | 2001-318812 | 11/2001 |
| JP | 2002-215423 | 8/2002 |

(Continued)

OTHER PUBLICATIONS

Korean Office Action issued Dec. 30, 2010 in a Korean Patent Application No. 10-2009-0024890 related to the copending U.S. Appl. No. 12/393,155 (4 pages, 4 pages English Translation).

(Continued)

*Primary Examiner* — Dwin M Craig
*Assistant Examiner* — Aniss Chad
(74) *Attorney, Agent, or Firm* — Staas & Halsey LLP

(57) ABSTRACT

A performance evaluation simulation apparatus divides a process into basic process units based on an execution log, calculates a throughput of each basic process unit from information held in the execution log, changes an arrangement structure so that a basic process unit with the calculated throughput exceeding a predetermined threshold is disposed in a hardware model, and performs a performance evaluation simulation on the hardware model and a software model to generate statistical information on which performance evaluation is based.

8 Claims, 16 Drawing Sheets

FOREIGN PATENT DOCUMENTS

| | | |
|---|---|---|
| JP | 2006-059108 | 3/2006 |
| JP | 2007-310449 | 11/2007 |
| KR | 10-0812938 | 3/2008 |
| WO | 02/27565 A1 | 4/2002 |

OTHER PUBLICATIONS

US Office Action issued in related U.S. Appl. No. 12/393,155.

U.S. Appl. No. 12/393,155, filed Feb. 26, 2009, Tomoki Kato, Fujitsu Limited.

T. Egolf et al., "VHDL-Based Rapid System Protyping", Journal of VLSI Signal Processing Systems for Signal, Image, and Video Technology, Springer, New York, vol. 2, No. 4, Nov. 1, 1996, pp. 125-154.

C. Hein et al., "Rassp Virtual Prototyping of DsP Systems", Proceedings of the Design Automation Conference, Anaheim, Jun. 9-13, 1997, pp. 492-497.

European Search Report dated Apr. 29, 2009 and issued in corresponding European Patent Application 08169674.2.

\* cited by examiner

ENTIRE EXECUTION LOG
(IMAGE OF SEQUENCE DIAGRAM)

EXECUTION LOG EXAMPLE
(BASIC PROCESS UNIT)

| BASIC PROCESS UNIT | INSTRUCTION EXECUTION TIME [ns] | INSTRUCTION FETCH TIME [ns] | DATA ACCESS TIME [ns] | CPU LOAD FACTOR [%] | ... |
|---|---|---|---|---|---|
| Fn [1] | 100 | 3 | 2 | 30 | ... |
| Fn [2] | 30 | 1 | 1 | 10 | ... |
| ⋮ | ⋮ | ⋮ | ⋮ | ⋮ | ⋮ |

Fn_if.h
```
class mod_fbk_if :
  virtual public sc_interface
{
public :
  virtual void do_process ( ) = 0 ;
    ...
protected :
  void blackbox (int x) ;
    ...
};
```

Fn_*.h
```
class mod_fbk_* :
  public mod_fbk_if
{
  void do_process( ) ;
    ...
};
```

Fn_if.cpp
```
#include "Fn_if.h"

void Fn_if::blackbox (int x)
{
  【 ※blackbox description 】
    ...
};
```

Fn_*.cpp
```
#include "Fn_*.h"

void Fn_*::do_process ( )
{
  【 ※whitebox description 】
    ...
  blackbox(x) ;
    ...
};
```

PERFORMANCE EVALUATION SIMULATION

CROSS-REFERENCE TO RELATED APPLICATIONS

This application is based upon and claims the benefit of priority of the prior Japanese Patent Application No. 2008-001606, filed on Jan. 8, 2008, the entire contents of which are incorporated herein by reference.

BACKGROUND

1. Field

The present invention relates to a performance evaluation simulation performed on a software model and a hardware model for which process to be performed are provisionally determined from system specifications by using software and hardware, respectively, for performance evaluation.

2. Description of the Related Art

Conventionally, a processor, a bus, a memory, and other components for use in electronic equipment are implemented on one LSI (Large Scale Integration) and, on that LSI (system LSI), a plurality of processes are performed. Such implementation of a plurality of processes on one LSI is for the purpose of downsizing the LSI and reducing cost and consumption power, for example. However, once the hardware and architecture of the LSI is determined, an easy change is difficult, thereby increasing the difficulty in designing the functions of the LSI.

In particular, to pursue downsizing and low cost of the LSI, it is important to reduce the process load on the LSI, and each process implemented on the LSI has to be optimally divided to software (hereinafter, "SW") or hardware (hereinafter, "HW"). Therefore, after SW or HW on which the function to be performed on the LSI is to be achieved is provisionally determined at the initial stage of LSI designing, SW/HW performance verification is performed.

In the performance verification explained above, for example, the software is written in C language, assembly language, or the like, and is executed on an actual machine model including a target processor, which is a processor implemented on the LSI for performance verification, or on an ISS (Instruction Set Simulator) for the target processor, thereby simulating the operation of the software. Also, for example, the hardware is written in RTL (Register Transfer Level) or TLM (Transaction Level Model), which are languages for describing hardware, or in a language obtained by mixing RTM and TLM, thereby simulating the operation of the hardware.

In this performance verification, when SW/HW division is performed at the initial stage of designing a system LSI, source codes of an application program and specifications of the system LSI are analyzed and divided by using man power to verify the validity of the division based on the number of cycles to be executed or the like. In recent years, various technologies for automatically performing this verification have been disclosed.

For example, Japanese Patent Application Laid-open No. 2001-142927 discloses that source codes completed to some extent are analyzed, and each processing unit is subjected to SW/HW division by taking a value of each processing unit as a determination factor, such as a throughput calculated from the number of clock cycles and an amount of consumed power calculated from the description part of a function.

Also, for example, Japanese Patent Application Laid-open No. H11-259552 discloses that architecture descriptions of a system LSI are converted to modules in units of execution to perform SW/HW division and the execution times of the respective modules obtained by executing simulations based on a benchmark program are compared, thereby determining the validity of SW/HW division.

However, in the conventional technologies explained above, it is difficult to optimally perform SW/HW division at the initial stage of designing, and it is also impossible to determine the validity of SW/HW division.

Specifically, in Japanese Patent Application Laid-open No. 2001-142927, since an analysis cannot be carried out until source codes of the application program are completed to some extent, it is difficult to optimally perform SW/HW division at the initial stage of designing. Also, in Japanese Patent Application Laid-open No. H11-259552, only the process times of the execution units are compared each other, and statistical information of a CPU (Central Processing Unit) obtained from a cache analysis of the system cannot be considered. Therefore, it is impossible to determine the validity of SW/HW division.

SUMMARY

It is an object of the present invention to at least partially solve the problems in the conventional technology.

According to an aspect of an embodiment, a performance evaluation simulation apparatus evaluates performance by performing a simulation on a software model and a hardware model in which a process to be performed is provisionally determined by using software and hardware from specifications of a system. The performance evaluation simulation apparatus includes a basic-process-unit dividing unit that makes a division into basic process units, which are execution units of process to be performed in the software model based on an execution log that represents execution history obtained by executing the software model on an actual machine or simulation software; a throughput calculating unit that calculates a throughput of each of the basic process units obtained through division by the basic-process-unit dividing unit, from the number of instruction address strings or the number of address strings for data access kept in the execution log; an arrangement-structure changing unit that compares each throughput calculated by the throughput calculating unit and a predetermined threshold and changes an arrangement structure so that a basic process unit with a throughput exceeding the predetermined threshold is changed from the software model to the hardware model; and a statistical-information generating unit that generates statistical information on which performance evaluation is based by performing a performance evaluation simulation on the basic process unit whose arrangement structure has been changed by the arrangement-structure changing unit to the hardware model and basic process units arranged in the software model, the performance evaluation simulation executing a bus access via an instruction cache and a data cache, to measure data required for operation analysis of the system.

According to another aspect of an embodiment, a performance evaluation simulation method is for evaluating performance by performing a simulation on a software model and a hardware model in which a process to be performed is provisionally determined by using software and hardware from specifications of a system. The performance evaluation simulation method includes making a division into basic process units, which are execution units of process to be performed in the software model based on an execution log that represents execution history obtained by executing the software model on an actual machine or simulation software; calculating a throughput of each of the basic process units obtained through the division, from the number of instruction address strings or the number of address strings for data access kept in the execution log; comparing each of the calculated throughputs and a predetermined threshold; changing an arrangement structure so that a basic process unit with a throughput exceeding the predetermined threshold is changed from the software model to the hardware model; and generating statistical information on which performance evaluation is based by performing a performance evaluation simulation on the basic process unit whose arrangement structure has been changed by the changing to the hardware model and basic process units arranged in the software model, the performance evaluation simulation executing a bus access via an instruction cache and a data cache, to measure data required for operation analysis of the system.

According to still another aspect of an embodiment, an electronic apparatus includes a performance evaluation simulation apparatus that performs a simulation on a process executed on software and hardware from specifications of a system and designs an LSI based on performance evaluations obtained by the performance evaluation simulation apparatus. The electronic apparatus includes an accepting unit that accepts a software model and a hardware model; a basic-process-unit dividing unit that makes a division into basic process units, which are execution units of process to be performed in the software model based on an execution log that represents execution history obtained by executing the software model on an actual machine or simulation software; a throughput calculating unit that calculates a throughput of each of the basic process units obtained through division by the basic-process-unit dividing unit, from the number of instruction address strings or the number of address strings for data access kept in the execution log; an arrangement-structure changing unit that compares each throughput calculated by the throughput calculating unit and a predetermined threshold and changes an arrangement structure so that a basic process unit with a throughput exceeding the predetermined threshold is changed from the software model to the hardware model; and a statistical-information generating unit that generates statistical information on which performance evaluation is based by performing a performance evaluation simulation on the basic process unit whose arrangement structure has been changed by the arrangement-structure changing unit to the hardware model and basic process units arranged in the software model, the performance evaluation simulation executing a bus access via an instruction cache and a data cache, to measure data required for operation analysis of the system; and an LSI generating unit that implements the software and the hardware on the LSI in a division manner based on the statistical information generated by the statistical-information generating unit.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

With reference to the attached drawings, embodiments of the performance evaluation simulation apparatus according to the present invention are explained in detail below. In the following, general outlines and features of the performance evaluation simulation apparatus according to the present invention, and the configuration and process flow of the performance evaluation simulation apparatus are explained in sequence, and then effects of the embodiments are explained last.

First Embodiment

[General Outlines and Features]

Figure 1:
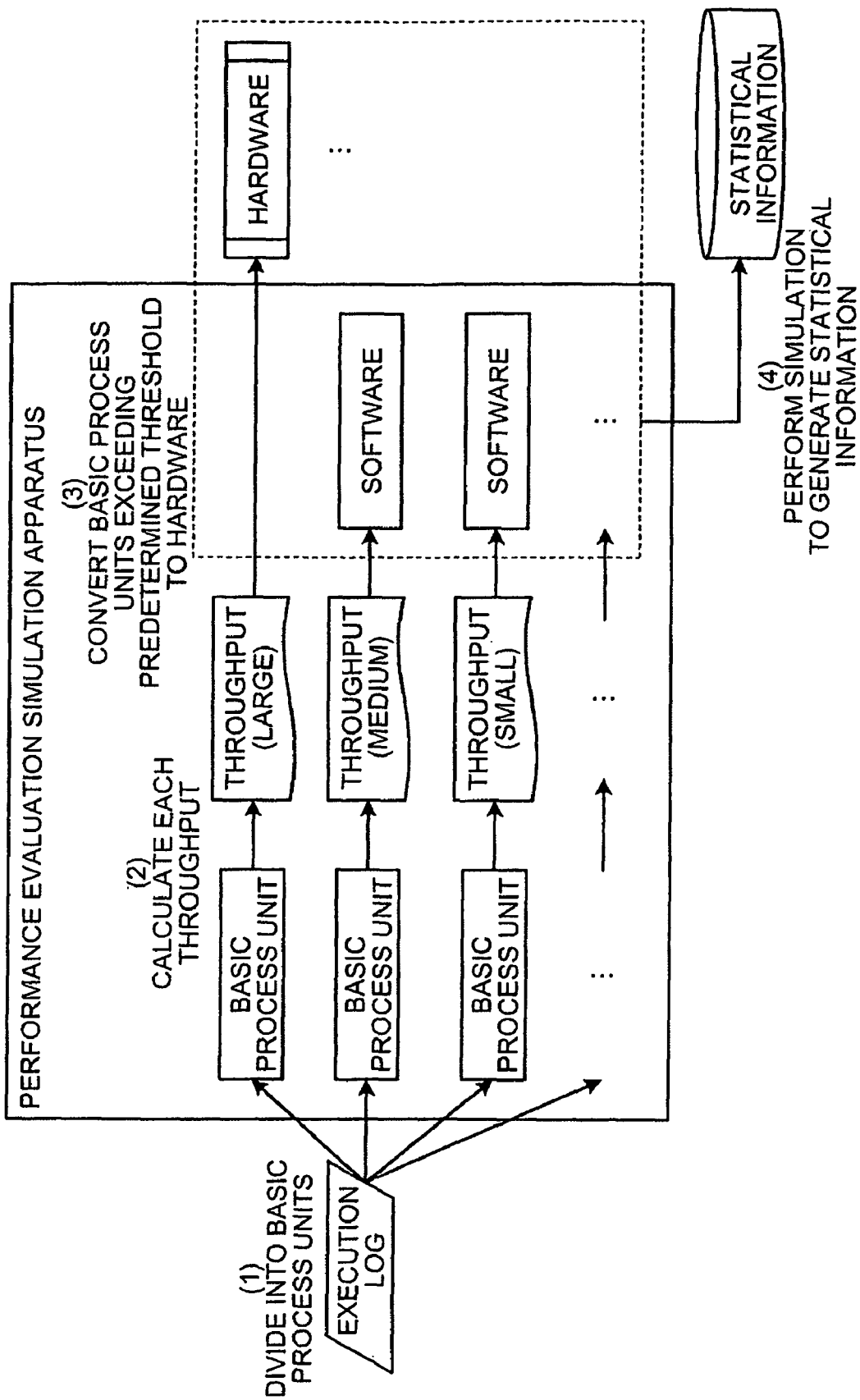
FIG. 1 is a drawing of general outlines and features of a performance evaluation simulation apparatus according to a first embodiment.

First, by using FIG. 1, general outlines and features of a performance evaluation simulation apparatus according to a first embodiment are explained. FIG. 1 is a drawing of general outlines and features of the performance evaluation simulation apparatus according to the first embodiment.

This performance evaluation simulation apparatus performs a performance evaluation simulation, with an execution log (instruction strings) as an input. The execution log represents execution history obtained from the results of dividing specifications of a system LSI into a software model and a hardware model and executing the software model obtained through the division on an actual machine or a target CPU using an ISS (Information Storage System) or the like.

In such a configuration, the general outlines of the performance evaluation simulation apparatus are such that, in the software model and the hardware model, a process to be performed in the software and the hardware is provisionally determined from the specifications of the system, and a performance evaluation is performed on each of the software model and the hardware model. In particular, main features of this apparatus are such that SW/HW division can be optimally performed at the initial stage of designing, and the validity of SW/HW division can be determined.

These main features are now specifically explained. Based on the execution log representing execution history obtained by executing the software model on an actual machine or simulation software, the performance evaluation simulation apparatus makes a division into basic process units, which are execution units of process to be performed in the software model (refer to (1) in FIG. 1).

A specific example is as follows. The performance evaluation simulation apparatus receives an input of an execution log representing execution history obtained from the results of dividing specifications of a system LSI into a software model and a hardware model and executing the software model on an actual machine or a target CPU using an ISS or the like. Then, based on the input execution log, the performance evaluation simulation apparatus makes a division into basic process units, which are execution units of process to be executed in the software model. In this division into basic process units, in the case of communication process software, for example, after a task starting point of an OS (Operating System) is found from the pattern of a periodic process, a division is made in units of task. Also, for example, after a process flow among object files is tracked from an instruction address string, and a break is found for division.

Then, the performance evaluation simulation apparatus calculates the throughput of each basic process unit obtained through division, from the number of instruction address strings or the number of address strings for data access kept in the execution log (refer to (2) in FIG. 1). Specifically, in the example above, the performance evaluation simulation apparatus calculates the throughput of each basic process unit obtained through division from the number of instruction address strings representing branch-destination address information at the time of process execution, the number of address strings for data access representing access-destination address information for accessing a database, or other information kept in the execution log.

Thereafter, the performance evaluation simulation apparatus compares each calculated throughput and a predetermined threshold, and changes an arrangement structure so that a basic process unit with a throughput exceeding the predetermined threshold is changed from the software model to the hardware model (refer to (3) in FIG. 1). Specifically, in the example above, the performance evaluation simulation apparatus compares each calculated throughput and a predetermined threshold throughput. Then, as a result of comparison, the performance evaluation simulation apparatus changes the arrangement structure so that a basic process unit with an execution log indicating a throughput exceeding the predetermined threshold throughput is changed from software processing to hardware processing so as to be directly connected to a bus, thereby making a conversion to hardware.

Then, on the basic process unit whose arrangement structure has been changed to the hardware model and the basic process units arranged in the software model, the performance evaluation simulation apparatus performs a performance evaluation simulation of executing a bus access via an instruction cache and a data cache to measure data required for system operation analysis, thereby generating statistical information on which performance evaluation is based (refer to (4) in FIG. 1). Specifically, in the example above, on the basic process unit whose arrangement structure has been changed to the hardware model and the basic process units arranged in the hardware model and on the basic process unit whose arrangement structure has been changed to the software model and the basic process units arranged in the software model, the performance evaluation simulation apparatus performs a performance evaluation simulation by executing a bus access via an instruction cache and a data cache. Then, the performance evaluation simulation apparatus measures an instruction execution time, an instruction fetch time, and a data access time, thereby generating statistical information on which performance evaluation is based, such as a CPU load factor. The statistical information generated by this performance evaluation simulation apparatus is used in determining the validity of optimal SW/HW division. Here, by performing a performance evaluation simulation a plurality of number of times, highly-accurate simulation results can be obtained.

In this manner, when the performance evaluation simulation apparatus according to the first embodiment performs a performance evaluation simulation based on the execution log obtained from the results of executing the software model on the actual machine or on the target CPU by using the ISS or the like, among the basic process units obtained through division based on the information kept in the execution log, a basic process unit having a large throughput is converted to hardware for execution of the simulation. As a result, as mentioned above in the main features, SW/HW division can be optimally performed at the initial stage of designing and the validity of SW/HW division can be determined.

That is, the performance evaluation simulation apparatus performs SW/HW division for each process by using the information kept in the execution log. Therefore, compared with the case as in the conventional technology where SW/HW division is performed depending on the degree of completion for each process implemented on the LSI, SW/HW division can be optimally performed at the initial stage of designing. Also, while measuring an instruction execution time, an instruction fetch time, and a data access time, the performance evaluation simulation apparatus performs a simulation by executing a bus access via an instruction cache and a data cache to output highly-accurate statistical information, such as a CPU load factor. Therefore, compared with the case as in the conventional technology where the process times of the respective execution units are compared each other, the validity of SW/HW division can be determined.

[Configuration of the Performance Evaluation Simulation Apparatus According to the First Embodiment]

Figure 2:
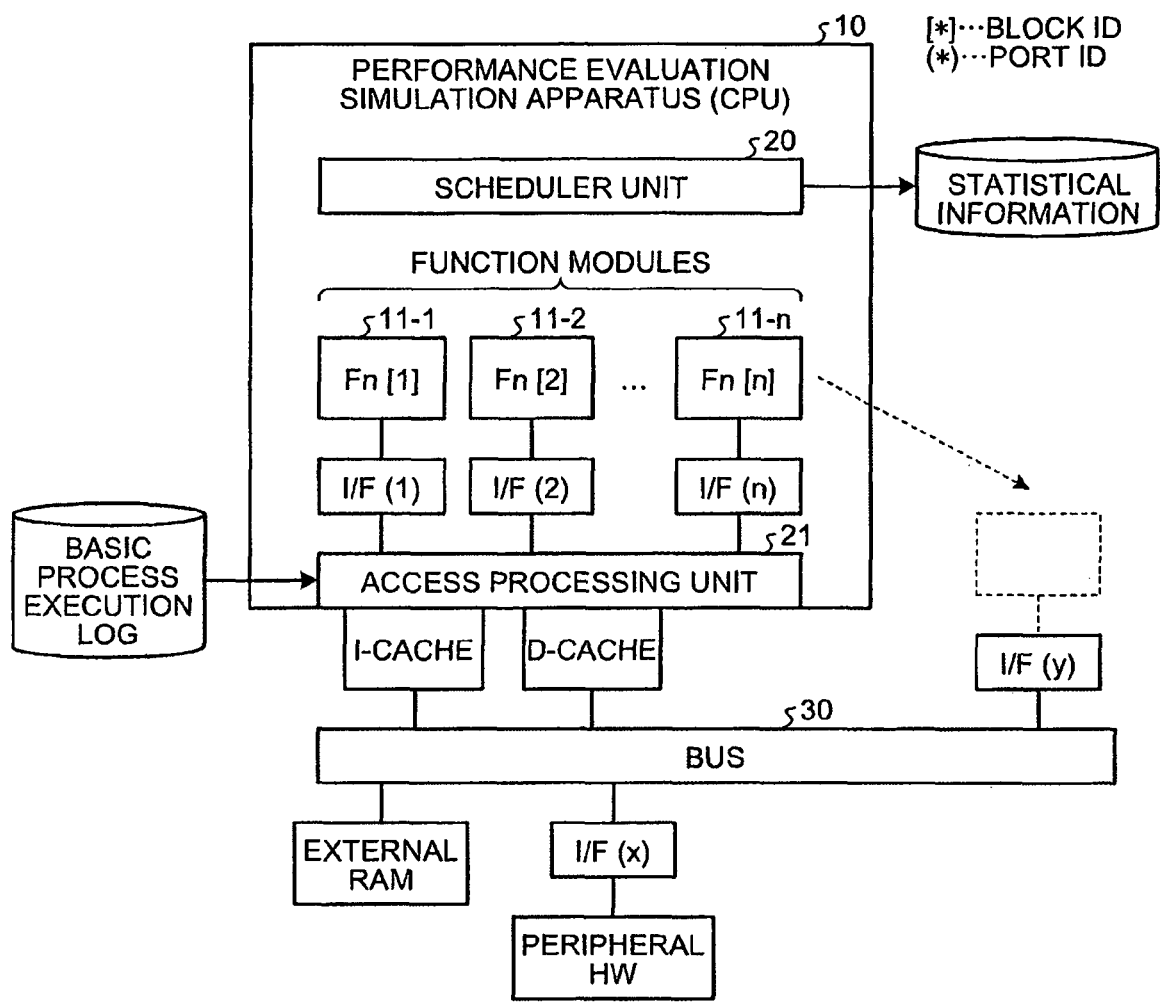
FIG. 2 is a drawing of the configuration of the performance evaluation simulation apparatus according to the first embodiment.

Next, by using FIG. 2, the configuration of the performance evaluation simulation apparatus according to the first embodiment is explained. FIG. 2 is a drawing of the configuration of the performance evaluation simulation apparatus according to the first embodiment. As depicted in FIG. 2, a performance evaluation simulation apparatus 10 includes function modules 11-1 to 11-*n*, a scheduler unit 20, and an access processing unit 21.

From an I-cache, which is an instruction cache for reducing a time for obtaining an instruction on an external RAM (Random-Access Memory), and a D cache, which is a data cache for reducing a time of data access, the performance evaluation simulation apparatus 10 is connected via a bus 30 to the external RAM, which is a RAM connected outside of the performance evaluation simulation apparatus 10, and peripheral HW including, for example, an external I/F (interface) and dedicated hardware for a specific purpose. Also, for example, portions other than a basic process execution log are constructed at a transaction level using the System C language, which is one of hardware description languages for the purpose of use in designing electronic circuitry. Transmission and reception between modules are performed with function calls. Furthermore, the connection to the bus 30 is performed by using an interface common to the modules (for example, TLM-I/F). Thus, unlike signal-level communications as in RTL, arrangement and recombination of the modules can be freely made.

Figures 3, 4:
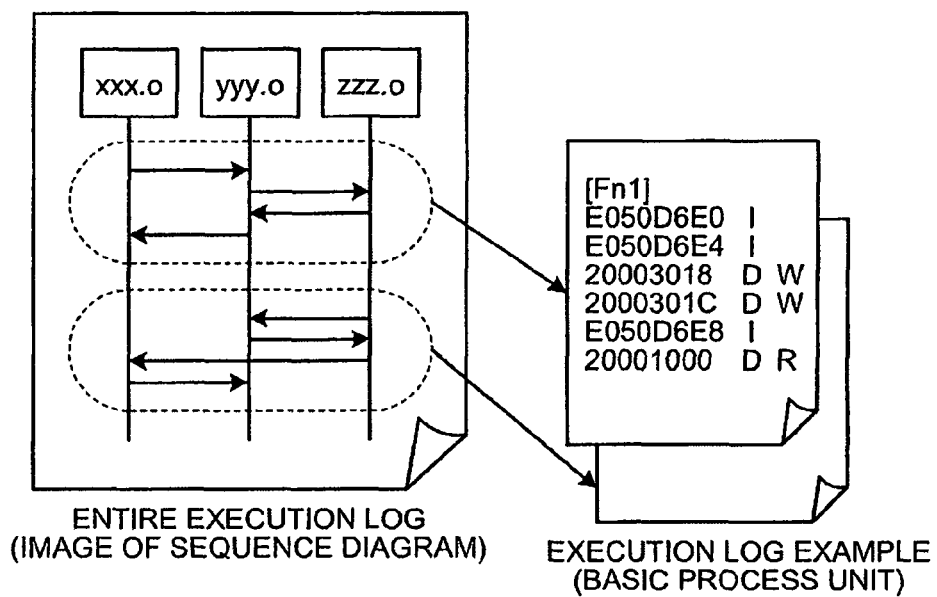
FIG. 3 is a drawing of a relation between accesses to addresses and basic process units in the entire execution log according to the first embodiment.
FIG. 4 is a drawing of an example of statistical information according to the first embodiment.

The function modules 11-1 to 11-*n* represent basic process units, which are execution units of process to be performed by the access processing unit 21 in the software model obtained through division based on the execution log. For example, the function module 11-1 (Fn[1]) retains, as depicted in FIG. 3, an address "E050D6E0", instruction/data access "I/D", and load (read)/store (write) "R/W" in the case of data access. In these pieces of information obtained from the execution log input to the performance evaluation simulation apparatus 10, once an address to be accessed is known, which address is accessed can be known from the RAM storing each hardware address and data. Then, from this address information, it can be known for which HW the performance evaluation simulation apparatus 10 makes an instruction or data access. In the case of data access, load or store can be known. Still further, in the execution log as a whole, each address is accessed among "xxx.o", "yyy.o", and "zzz.o" (object files), and a portion from the starting point to the ending point of an access among the object files is taken as a break, and is extracted as a basic process unit (Fn[1]). FIG. 3 is a drawing of a relation between accesses to addresses and basic process units in the entire execution log according to the first embodiment.

Based on the execution log representing execution history obtained by executing the software model on the actual machine or simulation software, the access processing unit 21 makes a division into basic process units, which are execution units of process to be executed in the software model. The access processing unit 21 then calculates the throughput of each basic process unit obtained through division from the number of instruction address strings or the number of address strings for data access kept in the execution log. Thereafter, the access processing unit 21 compares each calculated throughput and a predetermined threshold, and changes an arrangement structure so that a basic process unit with a throughput exceeding the predetermined threshold is changed from the software model to the hardware model. Then, the basic process unit whose arrangement structure has been changed to the hardware model and the basic process units arranged in the software model, the access processing unit 21 performs a performance evaluation simulation of executing a bus access via the instruction cache and the data cache.

A specific example is as follows. Based on the execution log, the access processing unit 21 makes a division into basic process units, which are execution units of process to be executed in the software model. The access processing unit 21 then calculates the throughput of each basic process unit obtained through division from the number of instruction address strings representing branch-destination address information at the time of process execution, the number of address strings for data access representing access-destination address information for accessing a database, or other information kept in the execution log.

Thereafter, the access processing unit 21 compares each calculated throughput and a predetermined threshold, and changes the arrangement structure so that a basic process unit with an execution log indicating a throughput exceeding the predetermined threshold throughput is changed from software processing to hardware processing so as to be directly connected to the bus 30, thereby making a conversion to hardware. Then, when accepting a request for process handling from the scheduler unit 20, the access processing unit 21 performs, on the basic process unit whose arrangement structure has been changed to the hardware model for conversion to hardware, a performance evaluation simulation by executing a bus access via the instruction cache (I-cache) and the data cache (D-cache), while measuring an instruction execution time, an instruction fetch time, and a data access time.

The scheduler unit 20 generates, from the simulation process executed by the access processing unit 21, statistical information on which performance evaluation is based. Specifically, in the example above, with an event that occurred as a trigger, the scheduler unit 20 requests a corresponding function module (basic process unit) for process handling. From the simulation results obtained by the access processing unit 21, the scheduler unit 20 then generates statistical information on which performance evaluation is based, such as a CPU load factor. This statistical information has stored therein, as depicted in FIG. 4, for example, an instruction execution time of "100 nanoseconds", an instruction fetch time of "3 nanoseconds", a data access time of "2 nanoseconds", and a CPU load factor of "30%" every basic process unit "Fn[1]". Also, the access processing unit 21 manages port IDs (IDentifiers) of interfaces connected to the external RAM, the peripheral HW, and others via the bus 30 and block IDs of the function modules 11-1 to 11-*n* in a unified manner, and knows the order of the function modules in which they requests of the access processing unit 21 process handling and also knows the arrangement of the function modules. FIG. 4 is a drawing of an example of statistical information according to the first embodiment.

[LSI Development Flow]

Figure 5:
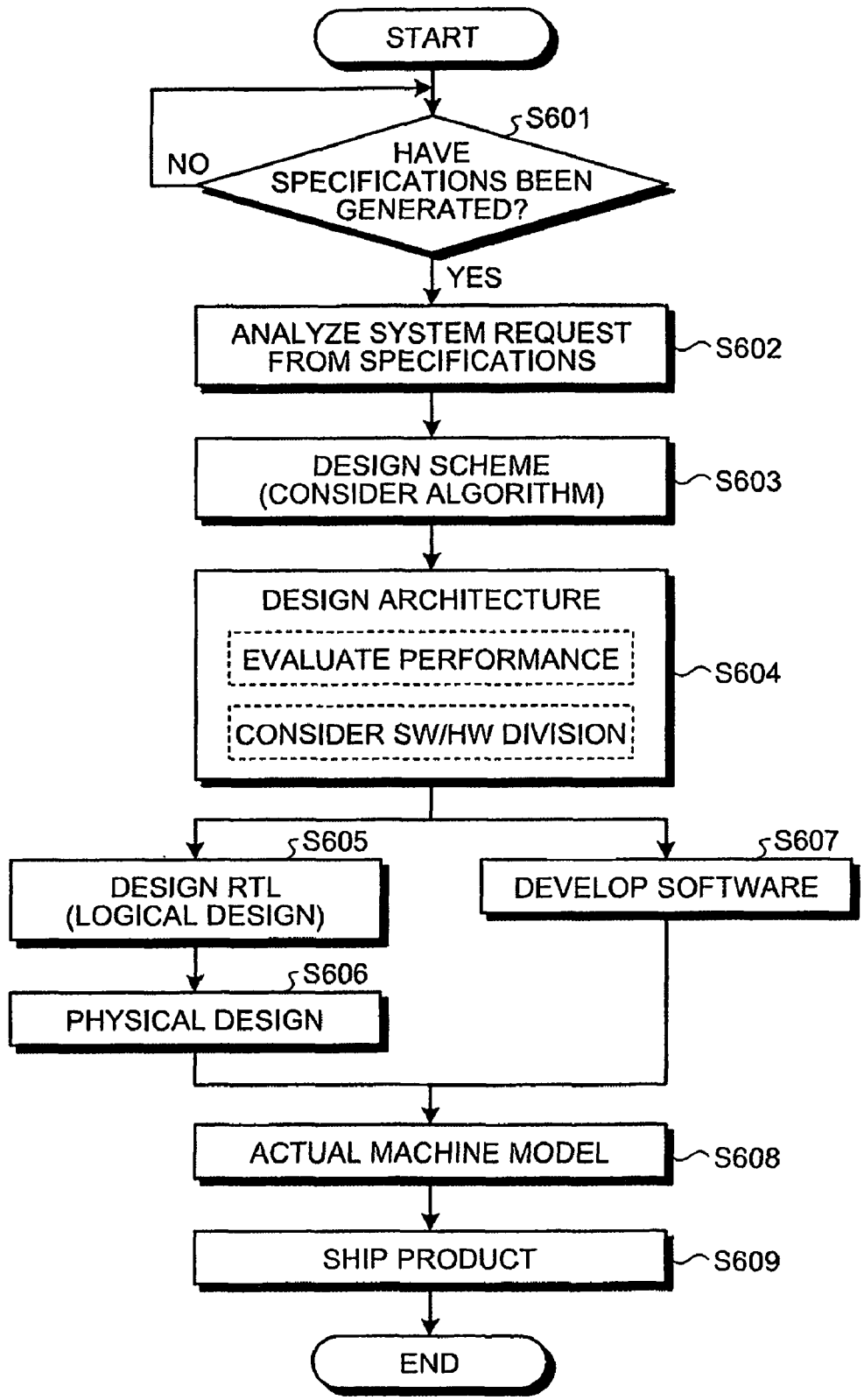
FIG. 5 is a drawing of an LSI development flow.

Next, by using FIG. 5, an LSI development flow is explained. FIG. 5 is a drawing of the LSI development flow. Here, this flow is to design the entire LSI including the process of the performance evaluation simulation apparatus according to the first embodiment.

As depicted in FIG. 5, upon generation of specifications ("Yes" at step S601), a system request is analyzed from the generated specifications (step S602). Then, from the analyzed system request, a scheme of considering an algorism is designed (step S603). Then, with performance evaluation and consideration of SW/HW division, architecture is designed (step S604). Thereafter, an RTL logical design is performed on a hardware part (step S605), and then a physical design of that hardware is performed (step S606). Also, software development is performed on the software part (step S607). Then, the hardware and the software are combined to generate an actual machine model (step S608), and then a product is shipped (step S609).

[Processes by the Performance Evaluation Simulation Apparatus According to the First Embodiment]

Figure 6:
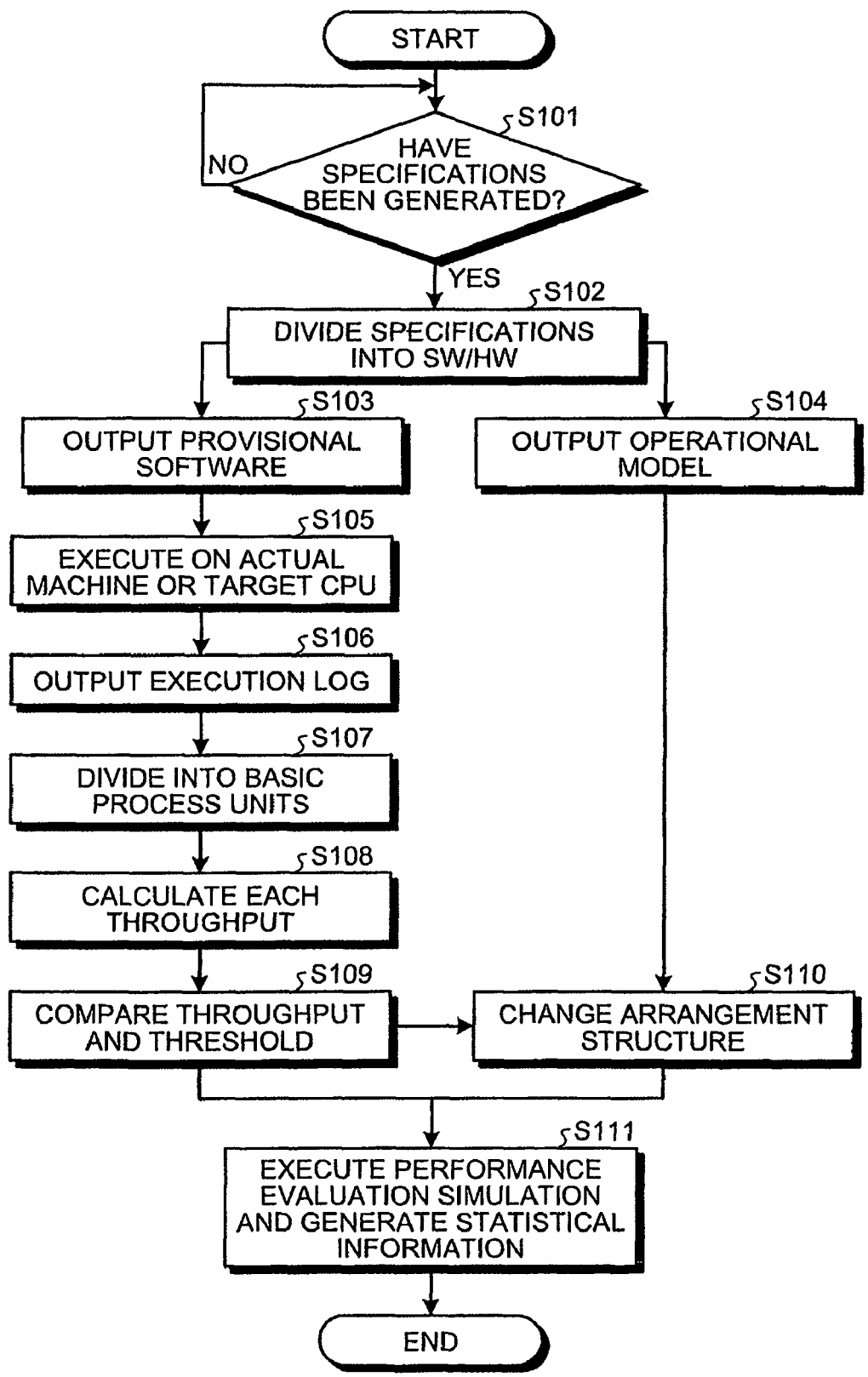
FIG. 6 is a flowchart of a simulation process of the performance evaluation simulation apparatus according to the first embodiment.

Next, by using FIG. 6, a simulation process by the performance evaluation simulation apparatus 10 according to the first embodiment is explained. FIG. 6 is a flowchart of the simulation process of the performance evaluation simulation apparatus 10 according to the first embodiment. Here, the process explained in FIG. 6 is part of the architecture designing at step S604 depicted in FIG. 5.

As depicted in FIG. 6, upon generation of specifications ("Yes" at step S101), the performance evaluation simulation apparatus 10 divides the specifications into software processing and hardware processing (step S102), and then outputs provisional software, which is a software model, and an operational model, which is a hardware model (steps S103 and S104). Upon output of an execution log representing execution history obtained from the results of executing the output provisional software on the actual machine or the target CPU using the ISS or the like (steps S105 and S106), based on the execution log, a division is made into basic process units, which are execution units of process to be performed in the software model (step S107).

Then, the performance evaluation simulation apparatus 10 calculates the throughput of each basic process unit obtained through division from the number of instruction address strings representing branch-destination address information at the time of process execution, the number of address strings for data access representing access-destination address information for accessing a database, or other information kept in the execution log (step S108).

Thereafter, the performance evaluation simulation apparatus 10 compares each calculated throughput and a predetermined threshold (step S109). Then, as a result of comparison, the performance evaluation simulation apparatus 10 changes the arrangement structure so that a basic process unit with an execution log indicating a throughput exceeding the predetermined threshold throughput is changed from software processing to hardware processing so as to be directly connected to a bus, thereby making a conversion to hardware (step S110). Here, when changing the arrangement structure of the basic process unit to hardware, the performance evaluation simulation apparatus 10 searches for a function module corresponding to the basic process unit with the throughput exceeding the predetermined threshold throughput based on the block ID, thereby changing the arrangement structure of that function module. That is, the performance evaluation simulation apparatus 10 moves the function module from inside of the CPU to a port capable of direct bus connection, thereby converting the work of the function module from software processing by the CPU to hardware.

Then, on the basic process unit whose arrangement structure has been changed to the hardware model and the basic process units arranged in the software model, the performance evaluation simulation apparatus 10 performs a performance evaluation simulation by executing a bus access via the instruction cache and the data cache, while measuring an instruction execution time, an instruction fetch time, and a data access time. Thereafter, from the instruction execution time, the instruction fetch time, and the data access time, the performance evaluation simulation apparatus 10 generates statistical information on which performance evaluation is based, such as a CPU load factor (step S111).

Figure 7:
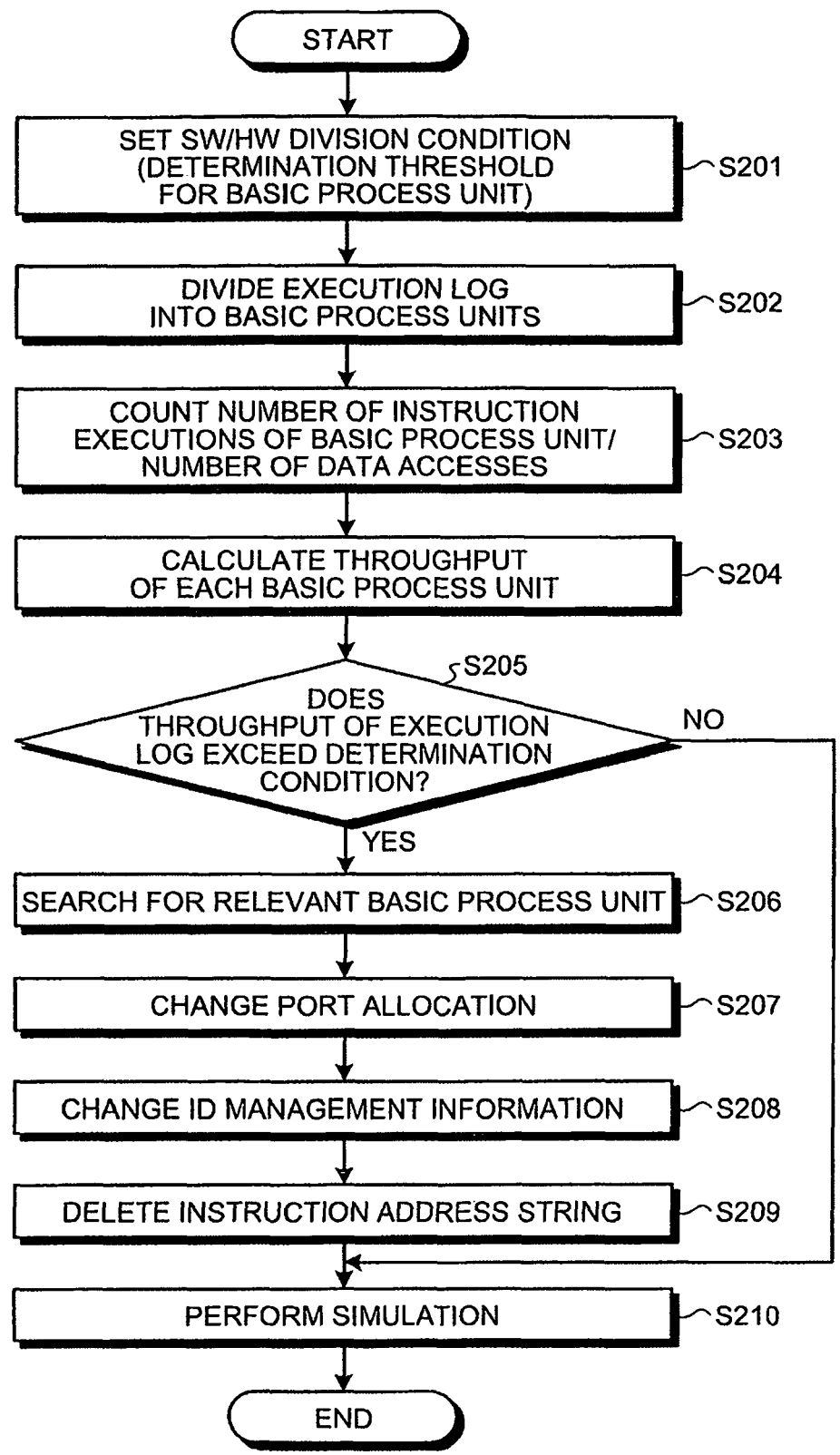
FIG. 7 is a drawing for explaining a SW/HW division process performed by the performance evaluation simulation apparatus according to the first embodiment.

Next, by using FIG. 7, a SW/HW division process by the performance evaluation simulation apparatus 10 according to the first embodiment is explained. FIG. 7 is a drawing for explaining the SW/HW division process performed by the performance evaluation simulation apparatus 10 according to the first embodiment.

As depicted in FIG. 7, the performance evaluation simulation apparatus 10 determines a throughput threshold (predetermined threshold) serving as a SW/HW division condition for the basic process unit (step S201). The performance evaluation simulation apparatus 10 then counts the number of instruction address strings and the number of address strings for data access kept in the execution log for the basic process unit obtained through division, and calculates the throughput of the basic process unit from either one of these counts (or from total counts) (steps S202 to S204).

Thereafter, when the calculated throughput exceeds the predetermined threshold ("Yes" at step S205), the performance evaluation simulation apparatus 10 searches for the basic process unit corresponding to the execution log exceeding the threshold based on the block ID (step S206). Then, the performance evaluation simulation apparatus 10 allocates the found basic process unit to a port capable of direct bus connection, and changes the port ID according to the change of the arrangement structure of the basic process unit to hardware (steps S207 and S208).

Then, the performance evaluation simulation apparatus 10 does not require a cache access to the basic process unit converted to hardware, and requires a direct access to the RAM. However, since no instruction fetch is required for the execution log, an instruction address string is deleted, and only the data access is extracted in performing a simulation (steps S209 and S210).

[Effects According to the First Embodiment]

With this, according to the first embodiment, the performance evaluation simulation apparatus 10 uses information kept in the execution log to perform SW/HW division for each process. Also, the performance evaluation simulation apparatus 10 performs a simulation by executing a bus access via the instruction cache and the data cache, while measuring the instruction execution time, the instruction fetch time, and the data access time. Therefore, SW/HW division can be optimally performed at the initial stage of designing, and the validity of SW/HW division can be determined.

For example, the performance evaluation simulation apparatus 10 calculates the throughput of each basic process unit based on either one of the number of instruction address strings or the number of address strings for data access kept in the execution log, or the total numbers thereof, and then changes the arrangement structure so that a basic process unit with a throughput exceeding the predetermined threshold is changed to a hardware model. The basic process unit whose arrangement structure has been changed to the hardware model and the basic process units arranged in the software model, the performance evaluation simulation apparatus 10 then performs a performance evaluation simulation of executing a bus access via the instruction cache and the data cache to generate statistical information, such as the instruction execution time, the instruction fetch time, and the data access time. As a result, the performance evaluation simulation apparatus 10 can optimally perform SW/HW division at the initial stage of designing, and can also determine the validity of SW/HW division.

Second Embodiment

Meanwhile, in the first embodiment, a conversion to hardware when a basic process unit obtained through division based on the execution log is taken as one execution unit is explained. However, the present invention is not meant to be restricted to such a conversion to hardware. Alternatively, another conversion to hardware with the basic process unit being formed of a first block and a second block can be considered.

Figure 8:
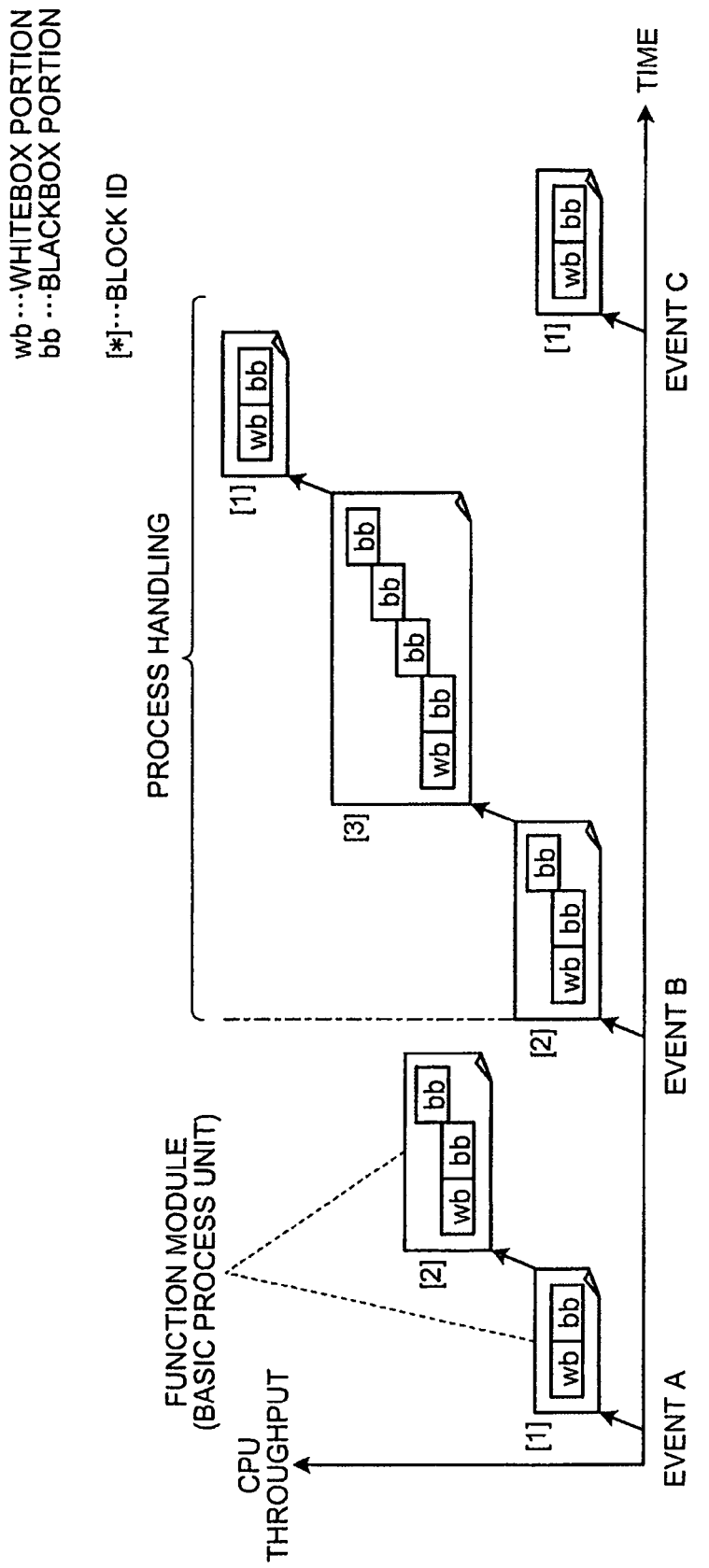
FIG. 8 is a drawing of a relation between a time and a CPU throughput when a CPU model periodically performs an event.
Figure 9:
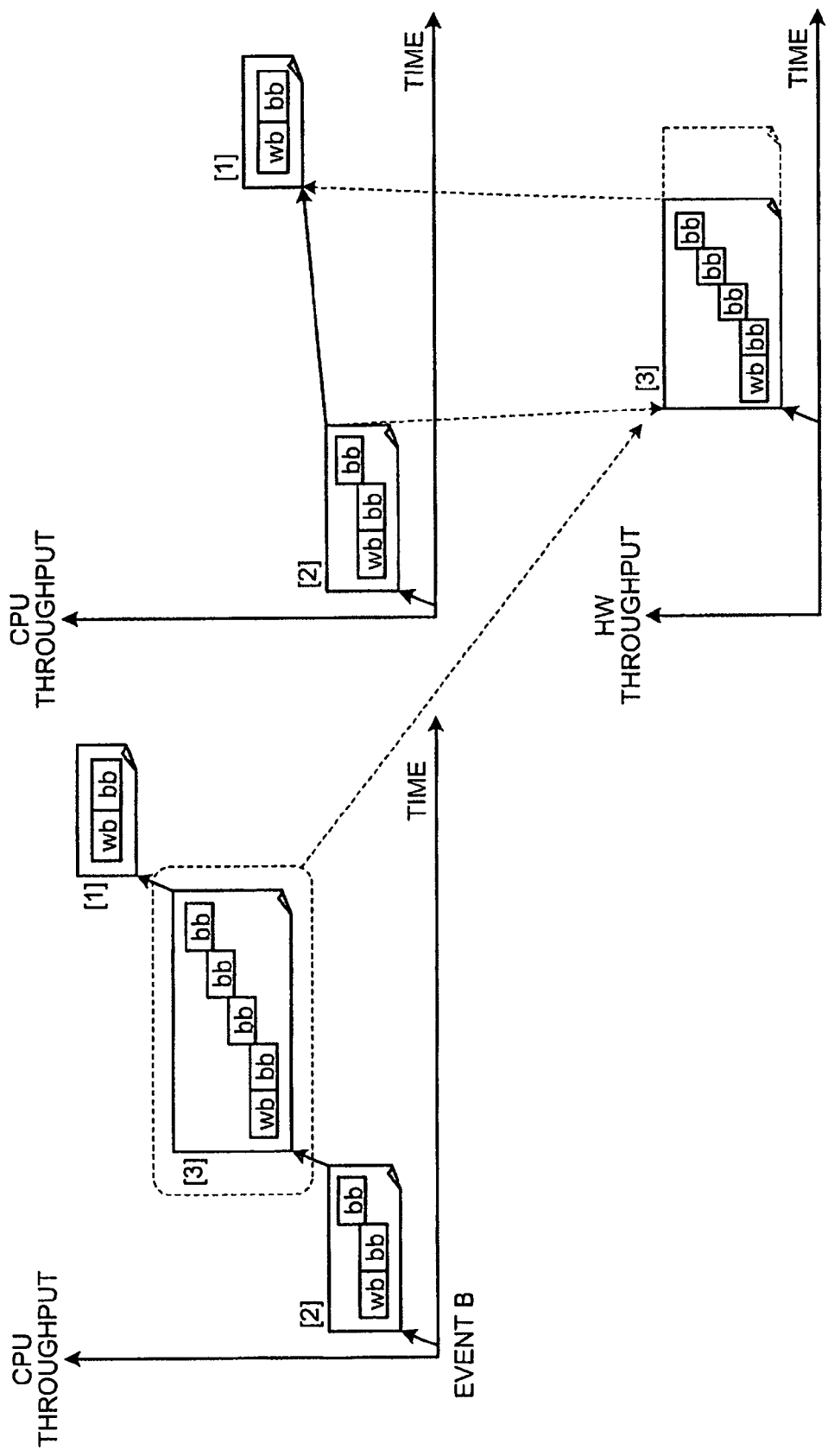
FIG. 9 is a drawing of an event process when part of function modules in the CPU is converted to hardware according to a second embodiment.
Figures 10, 11:
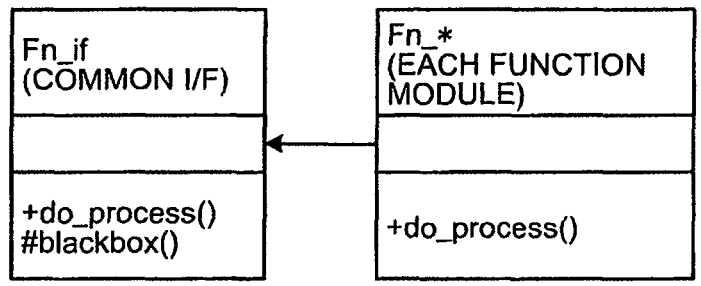
FIG. 10 is a drawing of an example of a UML class according to the second embodiment.
FIG. 11 is a drawing of an example of description in System C language according to the second embodiment.
Figure 12:
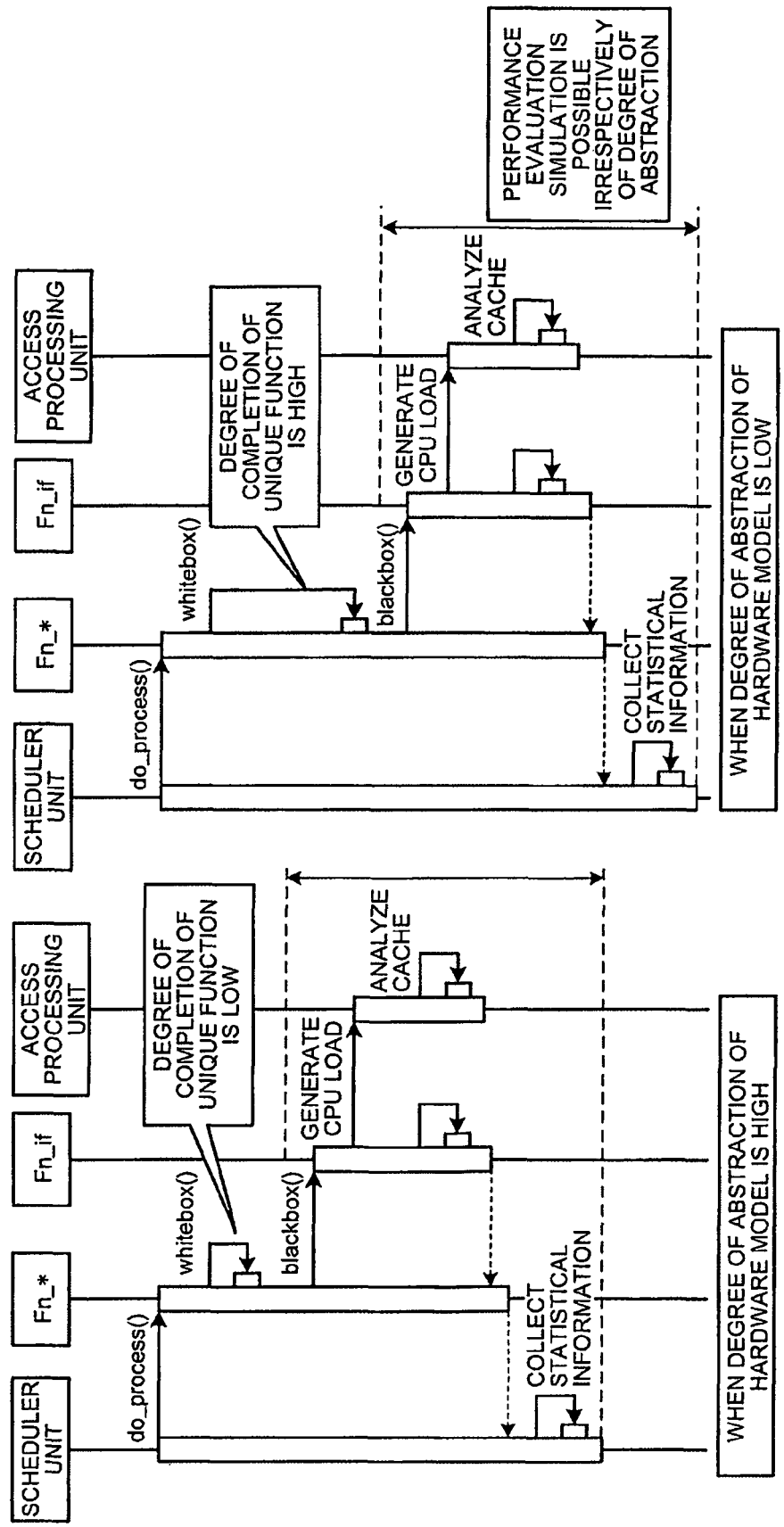
FIG. 12 is a drawing of a relation between a degree of abstraction of a hardware model and a simulation process according to the second embodiment.

In the following second embodiment, with reference to FIGS. 8 to 12, the conversion to hardware with the basic process unit being formed of a first block and a second block according to the second embodiment are explained in detail. FIG. 8 is a drawing of a relation between a time and a CPU throughput when the CPU model periodically performs an event. FIG. 9 is a drawing of an event process when part of function modules in the CPU is converted to hardware according to the second embodiment. FIG. 10 is a drawing of an example of a UML class according to the second embodiment. FIG. 11 is a drawing of an example of description in System C language according to the second embodiment. FIG. 12 is a drawing of a relation between degrees of abstraction of a hardware model and a simulation process according to the second embodiment. Here, the configuration, functions, and others of the performance evaluation simulation apparatus according to the second embodiment are similar to those according to the first embodiment, and therefore are not explained herein.

[Relation Between Times and CPU Throughputs when the CPU Model Periodically Performs an Event]

In the second embodiment, by using FIG. 8, the relation between the time and the CPU throughput when the CPU model periodically performs an event is explained. In FIG. 8, each basic process unit is formed of a whitebox portion having described therein a function unique to each basic process unit according to a process handling unit with combination of plurality of basic process units, and a blackbox portion where a process for collecting statistical information is performed. Also, process handling is a process of executing a plurality of basic process units in combination, whilst an event is formed of a combination of process handlings including processes of only basic process units. Here, with the vertical axis in FIG. 8 representing "CPU throughput" and the horizontal axis therein representing "time", the relation between the CPU throughput and the time is also explained.

As depicted in FIG. 8, for example, when a periodic event A occurs, with the event A as a trigger, the performance evaluation simulation apparatus 10 calls basic process units Fn[1] and Fn[2] sequentially. Then, when a periodic event B occurs, with the event B as a trigger, the performance evaluation simulation apparatus 10 calls basic process units Fn[2], Fn[3], Fn[1] sequentially. Then, when a periodic event C occurs, with the event C as a trigger, the performance evaluation simulation apparatus 10 calls the basic process unit Fn[1].

In the function module, which is a basic process unit, after the blackbox portion is called according to each process handling by the whitebox portion, statistical information is collected by the blackbox portion, such as the instruction execution time, the instruction fetch time, and the data access time. Also, the process time for the basic process is determined by "whitebox+blackbox×the number of calls" and, the longer the process time takes, the larger the CPU throughput. Also, for each event and basic process unit, a level of priority is provided so that a process is performed with a collision in time being avoided.

[Event Process when Part of the Function Modules in the CPU is Converted to Hardware]

Next, by using FIG. 9, an event process when part of the function modules in the CPU is converted to hardware is explained. In FIG. 9, the configuration of each basic process unit and others are similar to those depicted in FIG. 8, and therefore are not explained herein, and an event process when a basic process unit with a large throughput is converted to hardware is explained.

As depicted in FIG. 9, the performance evaluation simulation apparatus 10 changes the arrangement structure of the basic process unit Fn[3] with a throughput exceeding the predetermined threshold to hardware. In conversion of the basic process unit to hardware, as depicted in FIG. 9, the process time of the basic process unit Fn[3] converted to hardware is reduced, and also the CPU throughput for the entire event B is reduced.

That is, the performance evaluation simulation apparatus 10 converts the function module with a large load to hardware, thereby reducing the CPU throughput. Also, since the function module converted to hardware directly accesses the RAM, an instruction execution string is not required, and the address range for data access is also restricted. Therefore, the time is reduced compared with the case of accessing the D-cache (the cache for use at the time of data access), thereby reducing the process time of the blackbox portion and further reducing the process time of the entire process handling. Here, in association with an increase of the number of function modules to be converted to hardware, the threshold for SW/HW division should be set in consideration of an increase of an implementation area for conversion to hardware, an increase in power consumption, an increase in bus occupancy, and others.

[Relation Between the Degree of Abstraction of the Hardware Model and the Simulation Process]

Next, by using FIGS. 10 and 11, an example of a UML class and an example of description in System C language according to the second embodiment are explained. Also, by using FIG. 12, a relation between a degree of abstraction of the hardware model and a simulation process according to the second embodiment is explained. In FIG. 10 or 11, "Fn_*" represents a function module, "Fn_if" represents a function-module common interface, "Fn_*.h" represents a header portion of each function module, "Fn_*.cpp" represents source code, "Fn_if.h" represents a header portion of the function-module common interface, and "Fn_if.cpp" represents source code.

Of whitebox and blackbox forming a function module, the blackbox portion for performing a process for collecting statistical information is placed in the function-module common interface, and the whitebox portion in which a function unique to each module is described according to the purpose of performance verification and the degree of completion of the hardware model is placed in a process handling of "do_process( )" in each function module.

Then, each function module "Fn_*" instructed for the process handling of "do_process( )" from the scheduler unit executes the whitebox portion. Thereafter, the whitebox portion executes the function unique to each module, and then an argument "x" determined for each module is given to call a function of "blackbox( )". Then, based on the argument "x", the blackbox portion obtains the execution log of the basic process unit, the number of processes of instruction fetch and/or data access is specified from the execution log to cause a load to occur on the CPU, and also statistical information is collected, such as the instruction execution time.

[Effects According to the Second Embodiment]

In this manner, according to the second embodiment, the performance evaluation simulation apparatus 10 provides a CPU load irrespectively of execution of the function unique to each basic process unit. Therefore, cache analysis and obtainment of CPU statistical information and the like can be performed.

That is, as depicted in FIG. 12, irrespectively of execution of the function unique to each function module described in the whitebox portion, the performance evaluation simulation apparatus 10 can perform a performance evaluation simulation and optimum consideration of SW/HW division even the degree of abstraction of the hardware model according to the progress of LSI designing.

Third embodiment

[Determine a Threshold for Each Basic Process Unit]

In the first embodiment, the case is described in which the throughput of the basic process unit in SW/HW division and the predetermined threshold are compared each other to perform a simulation. However, the present invention is not meant to be restricted to this. Alternatively, the predetermined threshold of the basic process unit in SW/HW division can be changed with the CPU load factor, and then the predetermined threshold and the throughput can be compared each other to perform a simulation.

Figure 13:
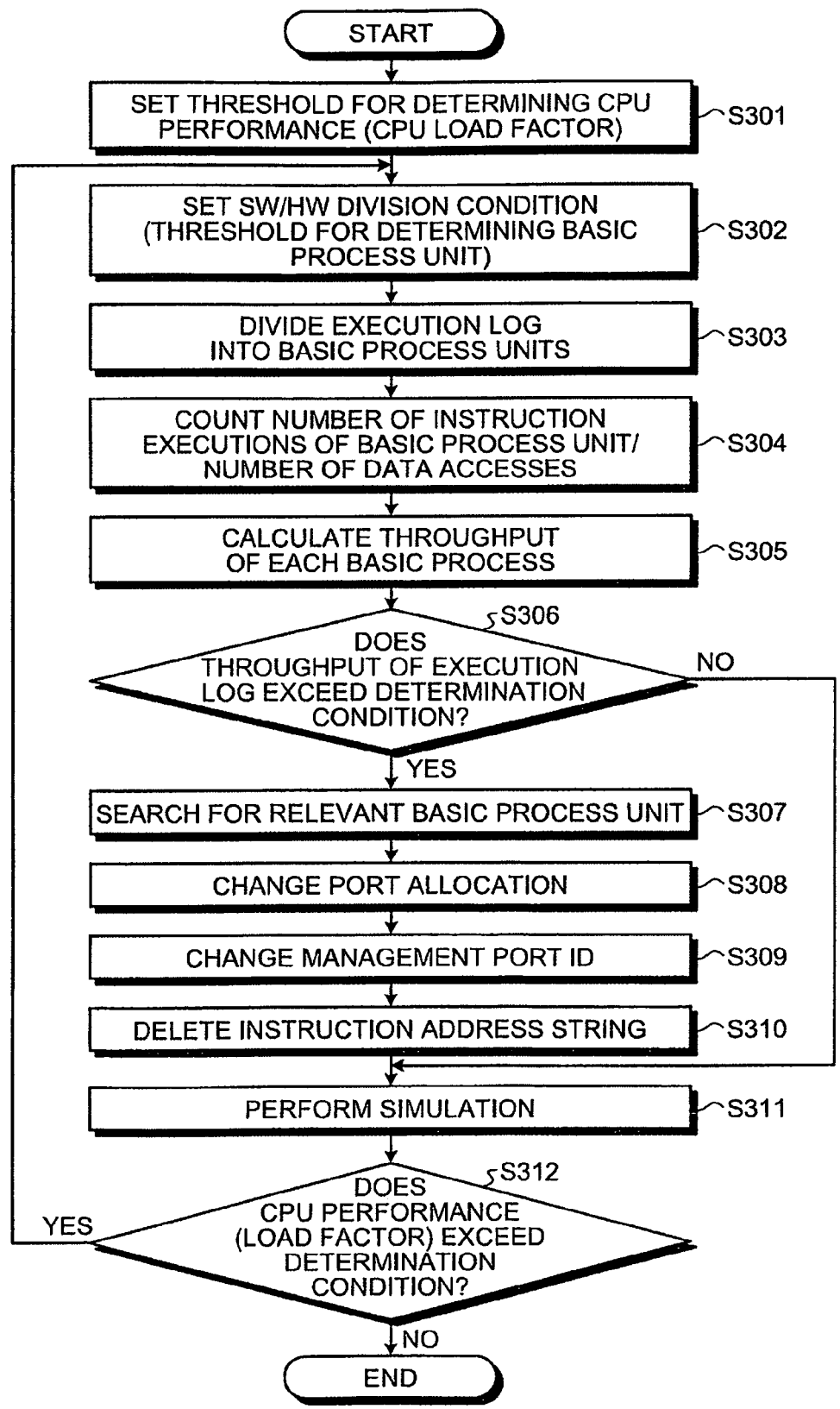
FIG. 13 is a drawing for explaining a performance evaluation simulation process according to a third embodiment.

In the following third embodiment, by using FIG. 13, a performance evaluation simulation process according to the third embodiment is explained. FIG. 13 is a drawing for explaining the performance evaluation simulation process according to the third embodiment. In the third embodiment, a performance evaluation simulation is performed with all function modules being contained in the target processor to correlate the number of times of instruction execution, the number of times of data loading, and the number of times of data storing in the execution log, and the CPU determination condition (for example, the CPU load factor and the bus occupancy).

As depicted in FIG. 13, the performance evaluation simulation apparatus 10 sets a threshold for determining a CPU performance based on the CPU load factor or the like (step S301) to determine a predetermined threshold for the basic process unit, which is a SW/HW division condition (step S302). Then, as with the first embodiment, the performance evaluation simulation apparatus 10 counts the number of instruction address strings, the number of address strings for data access, and others kept in the execution log obtained through division into basic process units, and then calculates the throughput of the basic process unit from either one of these counts (or from total counts) (steps S303 to S305).

Thereafter, when the calculated throughput exceeds the predetermined threshold ("Yes" at step S306), the performance evaluation simulation apparatus 10 searches for a basic process unit corresponding to the execution log with a threshold exceeding the threshold based on the block ID (step S307). Then, the performance evaluation simulation apparatus 10 allocates the found basic process unit to a port capable of direct bus connection, and changes the port ID according to the change of the arrangement structure of the basic process unit to hardware (steps S308 and S309).

Then, the performance evaluation simulation apparatus 10 does not require a cache access to the basic process unit converted to hardware, and requires a direct access to the RAM. However, since no instruction fetch is required for the execution log, an instruction address string is deleted, and only the data access is extracted in performing a simulation (steps S310 and S311). Then, when the CPU-performance determination condition is not satisfied ("Yes" at step S312), the procedure returns to step S302, where the performance evaluation simulation apparatus 10 determines (corrects) the threshold of throughput of the basic process unit. Here, the correction range of the threshold of the throughput of the basic process unit may be calculated from a correlation between the throughput of the execution log found in advance and the CPU-performance determination condition. Alternatively, the function modules may be converted to hardware one by one in decreasing (or increasing) order of basic process unit to perform a simulation until the CPU-performance determination condition is satisfied.

[Effects According to the Third Embodiment]

In this manner, according to the third embodiment, when the CPU performance determination condition based on the performance evaluation results cannot be satisfied, the performance evaluation simulation apparatus 10 changes the determination threshold of the basic process unit. With this, a more highly-accurate simulation can be performed to determine the validity of SW/HW division.

Fourth Embodiment

[Determine a Threshold for each Process Handling Unit]

In the first embodiment, the case is described in which the throughput of the basic process unit in SW/HW division and the predetermined threshold are compared each other to perform a simulation. However, the present invention is not meant to be restricted to this. Alternatively, the predetermined threshold of the process handling unit in SW/HW division can be changed with the CPU load factor, and then the predetermined threshold and the throughput can be compared each other to perform a simulation.

Figure 14:
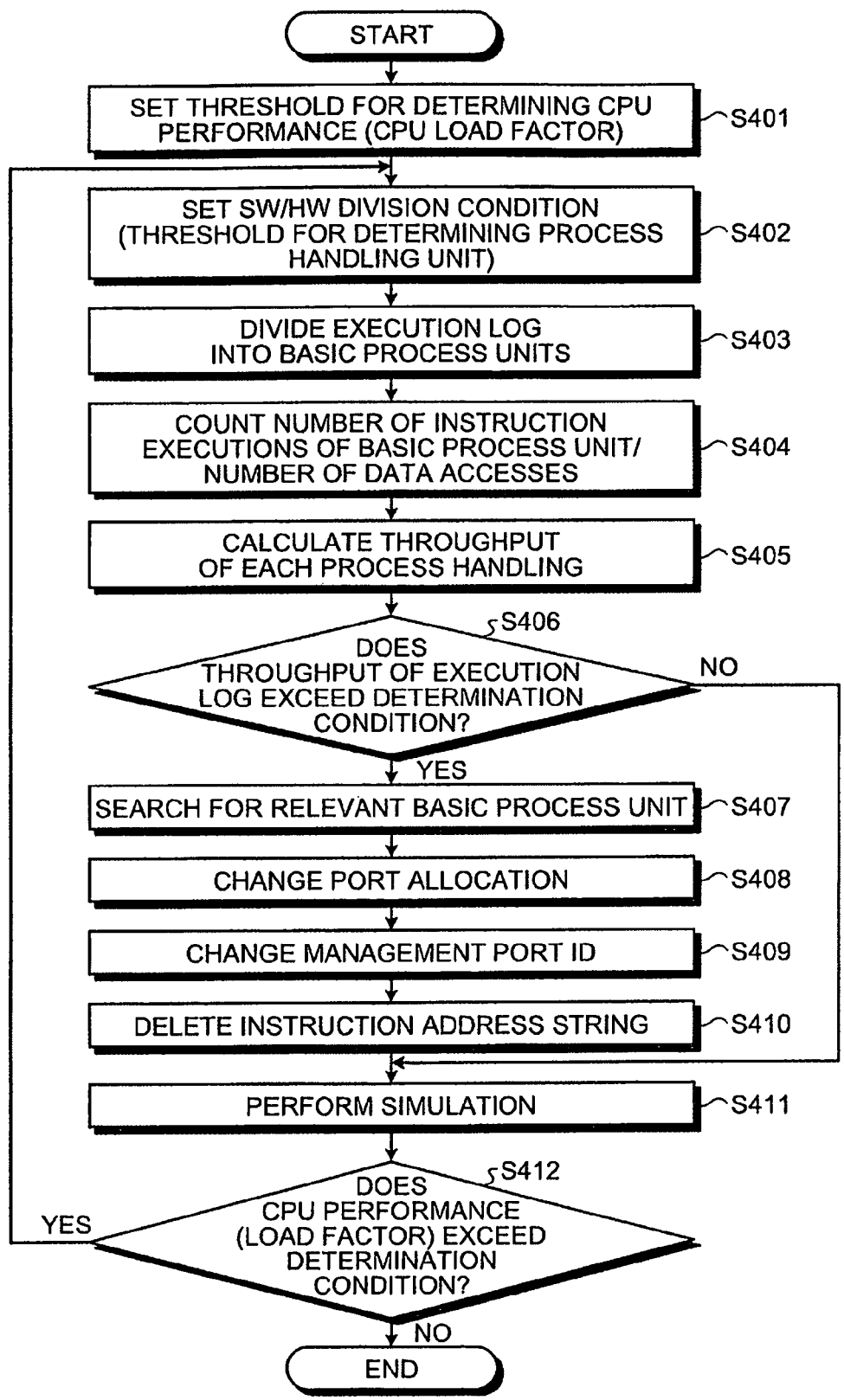
FIG. 14 is a drawing for explaining a performance evaluation simulation process according to a fourth embodiment.
Figure 15:
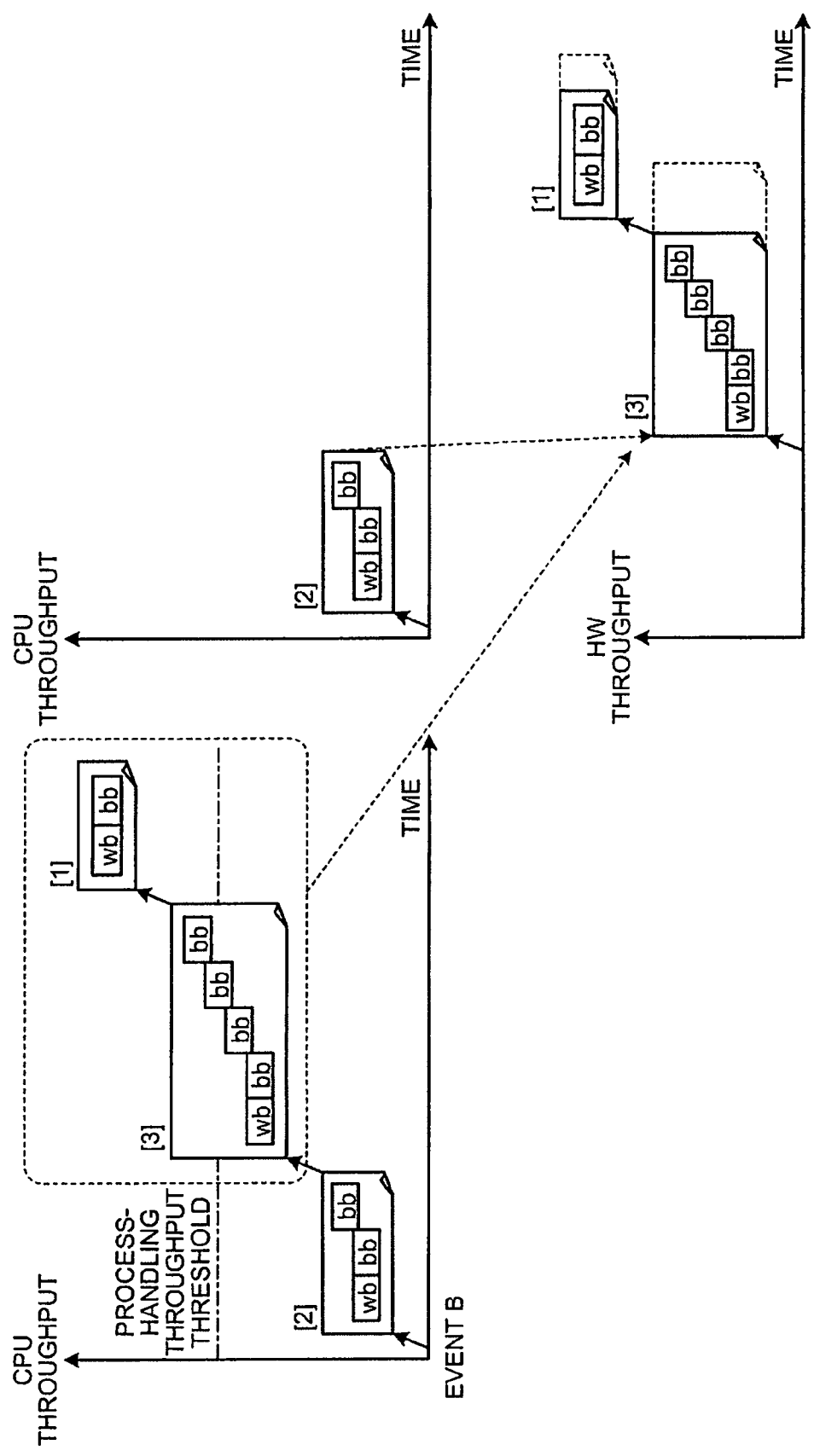
FIG. 15 is a drawing of an event process when part of process handlings in the CPU is converted to hardware according to the fourth embodiment.

In the following fourth embodiment, by using FIGS. 14 and 15, a performance evaluation simulation process according to the fourth embodiment is explained. FIG. 14 is a drawing for explaining the performance evaluation simulation process according to the fourth embodiment. FIG. 15 is a drawing of an event process when part of process handling in the CPU is converted to hardware according to the fourth embodiment. Here, in the fourth embodiment, the number of times of instruction execution and the number of times of data access in the execution log and the CPU determination condition (for example, a CPU load factor) are correlated in advance.

As depicted in FIG. 14, the performance evaluation simulation apparatus 10 sets a threshold for determining a CPU performance based on the CPU load factor or the like (step S401) to determine a predetermined threshold for the process handling unit, which is a SW/HW division condition (step S402). Then, as with the first embodiment, the performance evaluation simulation apparatus 10 counts the number of instruction address strings, the number of address strings for data access, and others kept in the execution log obtained through division into basic process units, and then calculates the throughput of the process handling unit from either one of these counts (or from total counts) (steps S403 to S405).

Thereafter, when the calculated throughput exceeds the predetermined threshold ("Yes" at step S406), the performance evaluation simulation apparatus 10 searches for a basic process unit corresponding to the execution log with a threshold exceeding the threshold based on the block ID (step S407). Then, the performance evaluation simulation apparatus 10 allocates the found basic process unit to a port capable of direct bus connection, and changes the port ID according to the change of the arrangement structure of the process handling unit to hardware (steps S408 and S409).

Then, the performance evaluation simulation apparatus 10 does not require a cache access to the process handling unit converted to hardware, and requires a direct access to the RAM. However, since no instruction fetch is required for the execution log, an instruction address string is deleted, and only the data access is extracted in performing a simulation (steps S410 and S411). Then, when the CPU-performance determination condition is not satisfied ("Yes" at step S412), the procedure returns to step S402, where the performance evaluation simulation apparatus 10 determines (corrects) the threshold of throughput of the process handling unit. Here, the correction range of the threshold of the throughput of the process handling unit may be calculated from a correlation between the number of times of instruction execution and the number of times of data access found in advance in the execution log, and the CPU-performance determination condition. Alternatively, the function modules may be converted to hardware one by one in decreasing (or increasing) order of process handling unit to perform a simulation until the CPU-performance determination condition is satisfied.

Also, as depicted in FIG. 15, the performance evaluation simulation apparatus 10 changes the arrangement structure of the process handling units Fn[3] and Fn[1] with their throughputs exceeding the predetermined threshold to hardware. In conversion of the process handling unit to hardware, as depicted in FIG. 15, for each of the process handling units Fn[3] and Fn[1] converted to hardware, the process time is reduced, and also the CPU throughput in the entire event B is decreased.

That is, the performance evaluation simulation apparatus 10 converts a function module with a large load to hardware by process handling units, thereby reducing the CPU throughput. Also, since the function module converted to hardware directly accesses the RAM, an instruction execution string is not required, and the address range for data access is also restricted. Therefore, the time is reduced compared with the case of accessing the D-cache (the cache for use at the time of data access), thereby reducing the process time of the blackbox portion and further reducing the process time of the entire process handling.

[Effects According to the Fourth Embodiment]

In this manner, according to the fourth embodiment, when the CPU performance determination condition based on the performance evaluation results cannot be satisfied, the performance evaluation simulation apparatus 10 changes the determination threshold of the process handling unit. With this, a more highly-accurate simulation can be performed to determine the validity of SW/HW division.

Fifth Embodiment

[Use the File Size of the Execution Log]

In the first embodiment, the case is descried in which a simulation is performed with the predetermined threshold of the basic process unit in SW/HW division being determined in advance. However, the present invention is not meant to be restricted to this. Alternatively, the predetermined threshold of the basic process unit in SW/HW division can be determined by using the file size of the execution log.

Figure 16:
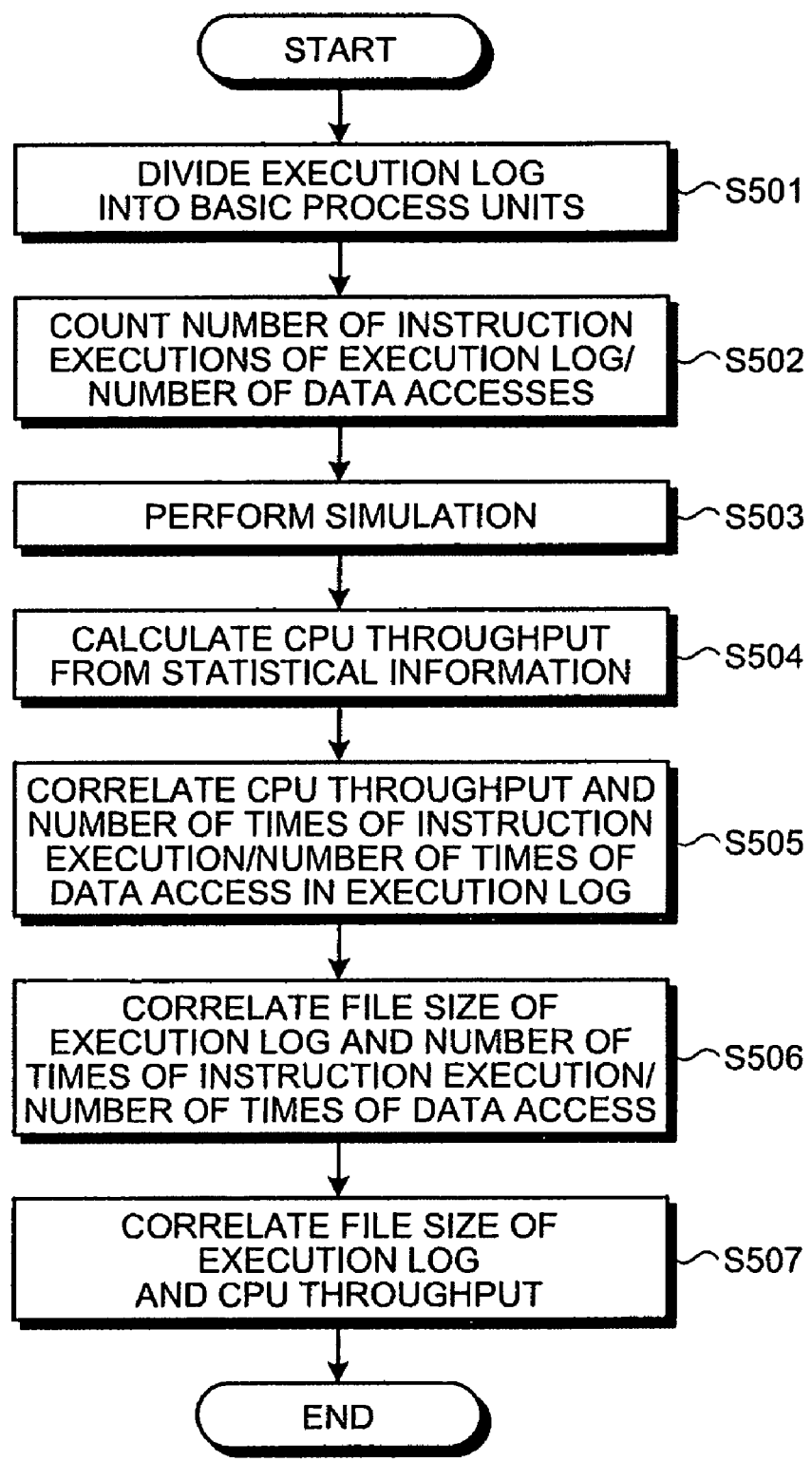
FIG. 16 is a drawing for explaining the case where the file size of an execution log is used as the threshold of SW/HW division according to a fifth embodiment.

In the following fifth embodiment, by using FIG. 16, the case where the file size of the execution log is used as the threshold of SW/HW division according to the fifth embodiment is explained. FIG. 16 is a drawing for explaining the case where the file size of the execution log is used as the threshold of SW/HW division according to the fifth embodiment.

As depicted in FIG. 16, the performance evaluation simulation apparatus 10 counts the number of instruction address strings and the number of address strings for data access kept in the execution log of the basic process unit obtained through division, performs a simulation with all function modules being contained in the target processor, and, from statistical information obtained by execution of the simulation, calculates the CPU throughput (steps S501 to S504).

Then, the performance evaluation simulation apparatus 10 uses the calculated CPU throughput to correlate the number of times of instruction execution, the number of times of data loading, and the number of times of data storing in the execution log, and the CPU determination condition (for example, the CPU load factor) (step S505). The performance evaluation simulation apparatus 10 then correlates each file size of the execution log obtained through division into basic process units and the number of times of instruction execution and/or the number of times of data access in that file (step S506). Then, from the results at steps S505 and S506, the performance evaluation simulation apparatus 10 correlates the CPU throughput and the file size of the execution log of the basic process unit (step S507). Based on the process above, the performance evaluation simulation apparatus 10 takes the file size of the execution log as the threshold of SW/HW division.

[Effects According to the Fifth Embodiment]

In this manner, according to the fifth embodiment, the performance evaluation simulation apparatus 10 uses the file size of the execution log as the threshold in SW/HW division. With this, a more highly-accurate simulation can be performed to determine the validity of SW/HW division.

Sixth Embodiment

[Consideration of Conversion to Multi-Core by Using an Add-On CPU]

In the first embodiment, the case is described in which the validity of optimal SW/HW division is determined by performing a performance evaluation simulation. However, the present invention is not meant to be restricted to this. Alternatively, conversion to multi-core trough SW/SW division can be considered.

Figure 17:
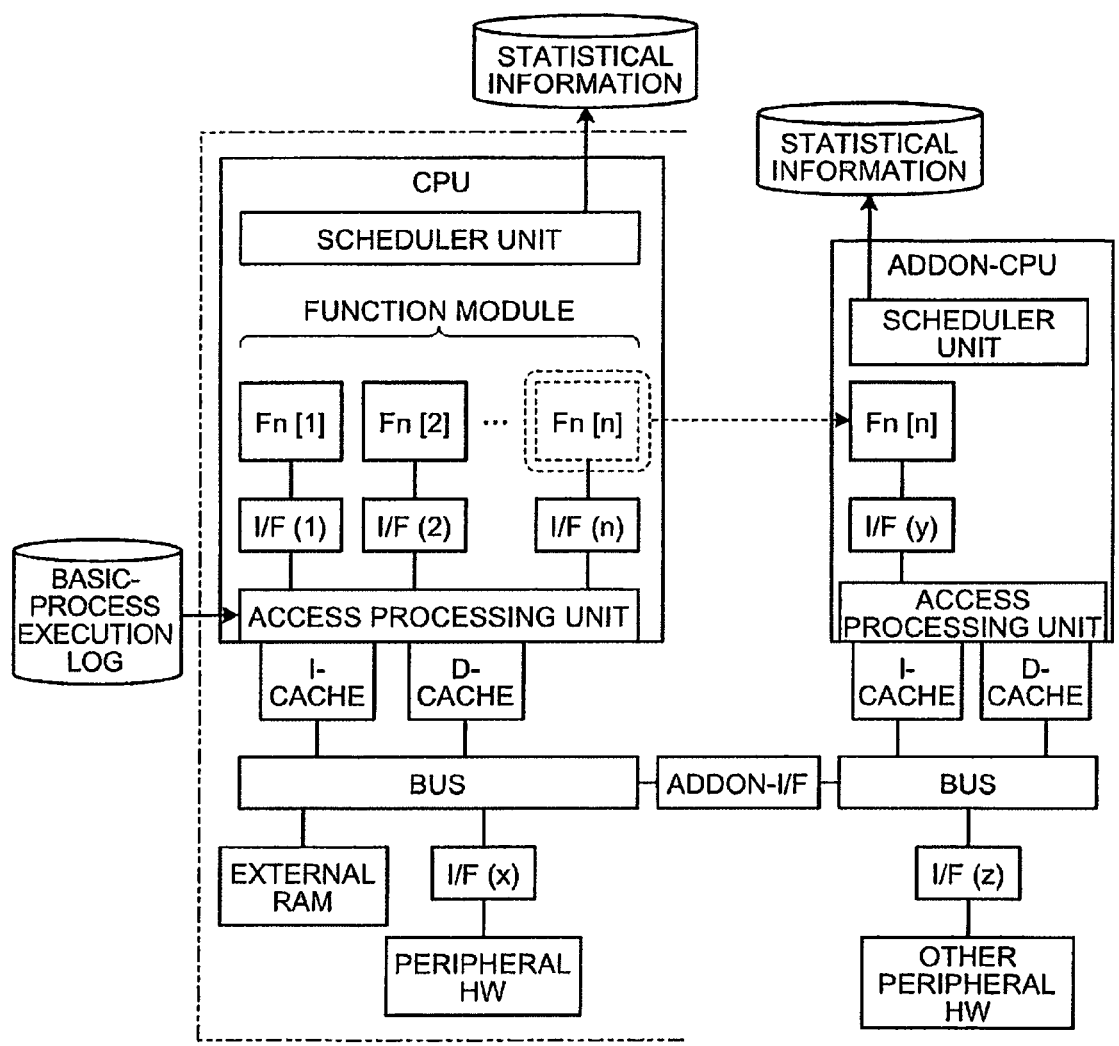
FIG. 17 is a drawing for explaining a consideration of conversion to multi-core by using an add-on CPU according to a sixth embodiment.

In the following sixth embodiment, by using FIG. 17, the consideration of conversion to multi-core by using an add-on CPU is explained. FIG. 17 is a drawing for explaining a consideration of conversion to multi-core by using an add-on CPU according to the sixth embodiment. Here, a new bus model is configured outside of the performance evaluation simulation device to be subjected to performance evaluation and, on the bus, an ADDON-CPU, an I-cache, a D-cache, and peripheral HW as required are disposed, thereby constructing a performance evaluation simulation environment. Note that the structures of the ADDON-CPU, the I-cache, and the D-cache are similar to these in CPU, and the process is performed so that a port ID and a block ID for managing the arrangement of each module and the process order do not overlap each other.

As depicted in FIG. 17, for example, according to the predetermined threshold of SW/HW division, the performance evaluation simulation apparatus 10 separates the relevant function module Fn[n] from the CPU module, places it in the interface in the ADDON-CPU, and changes the port ID of the function module Fn[n]. Then, the statistical information obtained from the simulation execution results is collected individually by the CPU and the ADDON-CPU for cache analysis on effects when the software processing is distributed among a plurality of CPUs.

That is, the performance evaluation simulation apparatus 10 distributes and outputs the function modules to be converted to hardware in the CPU based on the threshold to the ADDON-CPU. As a result, the output is in a form of software×software.

[Effects According to the Sixth Embodiment]

In this manner, according to the sixth embodiment, the performance evaluation simulation apparatus 10 distributes and outputs the function modules to be converted to hardware in the CPU based on the threshold of SW/HW division to the ADDON-CPU. With this, multi-core where a plurality of CPU core is present in one CPU can be considered.

Seventh Embodiment

Meanwhile, while the embodiments of the present invention have been explained, the present invention can be implemented with various different embodiments other than the embodiment explained above. Here, different embodiments in (1) the configuration of the performance evaluation simulation apparatus, (2) an electronic apparatus including the performance evaluation simulation apparatus as one design process, and (3) a program are explained.

(1) Configuration of the Performance Evaluation Simulation Apparatus

The process procedure, the control procedure, and the information including specific names and various data and parameters (for example, information stored as "the statistical information" depicted in FIG. 2) can be arbitrarily change unless otherwise specified.

Furthermore, each component of each apparatus depicted is conceptual in function, and is not necessarily physically configured as depicted. That is, the specific patterns of distribution and unification of each apparatus are not meant to be restricted to those depicted in the drawings. For example, the access processing unit 21 may be distributed into a basic-process-unit dividing unit that makes a division into basic process units based on an execution log, a throughput calculating unit that calculates a throughput of each basic process unit, an arrangement-structure changing unit that changes an arrangement structure so that a basic process unit is changed to hardware, and a simulation performing unit that performs a performance evaluation simulation. As such, all or part of the components can be functionally or physically distributed or unified in arbitrary units according to various loads and the state of use. Furthermore, all or arbitrary part of the process function performed in each apparatus can be achieved by a CPU and a program analyzed and executed on that CPU, or can be achieved as hardware with a wired logic.

(2) Electronic Apparatus Including the Performance Evaluation Simulation Apparatus as One Design Process Still further, in the embodiments explained above, the performance evaluation simulation apparatus for performing optimal SW/HW division for a software model and a hardware model is explained. However, the present invention is not meant to be restricted to this. Alternatively, an electronic apparatus with the performance evaluation simulation apparatus being included as one design process can be thought for processing.

For example, such an electronic apparatus accepts a software model and a hardware model in which a process to be performed is provisionally determined by using software and hardware from specifications of a system, and uses the accepted software model and hardware model to implement software and hardware obtained through re-division on an LSI, based on statistical information generated by performing such a performance evaluation simulation as explained above.

(3) Program

Figure 18:
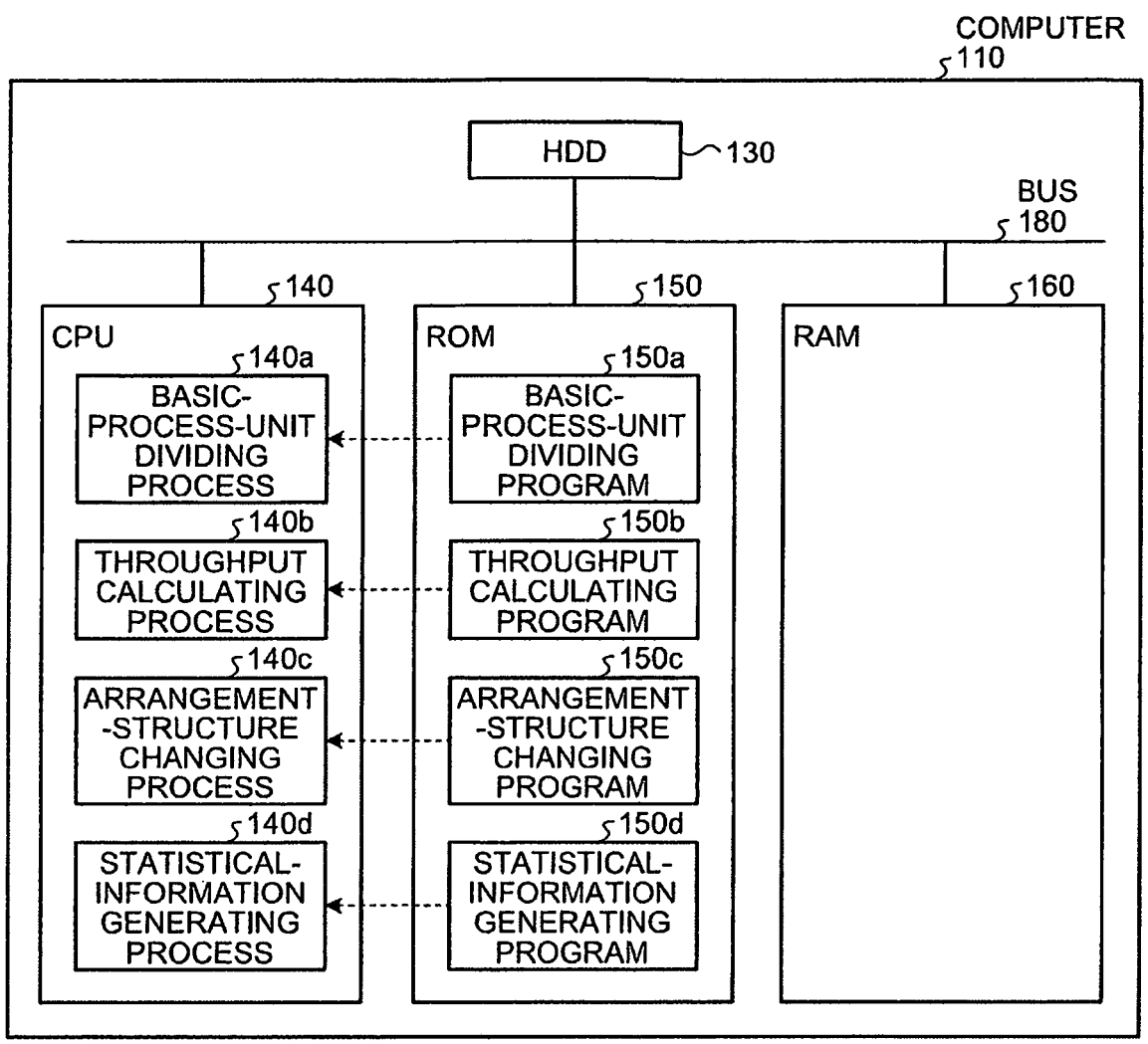
FIG. 18 is a drawing of a computer that executes a performance evaluation simulation program.

Meanwhile, in the embodiments explained above, the case is explained in which various processes are achieved by hardware logics. However, the present invention is not meant to be restricted to this. Alternatively, various processes may be achieved by a computer executing a program provided in advance. In the following, by using FIG. 18, an example of a computer is explained that executes a performance evaluation simulation program with functions similar to those of the performance evaluation simulation apparatus in each of the embodiments above. FIG. 18 is a drawing of a computer that executes a performance evaluation simulation program.

As depicted in FIG. 18, a computer 110 as a performance evaluation simulation apparatus includes an HDD 130, a CPU 140, a ROM 150, and a RAM 160 that are connected each other via a bus 180.

In the ROM 150, performance evaluation simulation programs that achieve functions similar to those of the performance evaluation simulation apparatus 10 explained in the first embodiment are stored in advance: That is, as depicted in FIG. 18, those programs stored in advance are a basic-process-unit dividing program 150*a*, a throughput calculating program 150*b*, an arrangement-structure changing program 150*c*, and a statistical-information generating program 150*d*. Here, as with each component of the performance evaluation simulation apparatus 10 depicted in FIG. 2, these programs 150*a* to 150*d* may be unified or distributed as appropriated.

Then, the CPU 140 reads these programs 150*a* to 150*d* from the ROM 150 for execution. With this, as depicted in FIG. 18, they become functioning as a basic-process-unit dividing process 140*a*, a throughput calculating process 140*b*, an arrangement-structure changing process 140*c*, and a statistical-information generating process 140*d*. Here, the processes 140*a* to 140*d* correspond to the scheduler unit 20 and the access processing unit 21 depicted in FIG. 2.

Then, the CPU 140 executes the performance evaluation simulation programs based on the data recorded on the RAM 160.

Here, these programs 150*a* to 150*d* are not necessarily required to be stored in advance in the ROM 150. Alternatively, each program may be stored in, for example, a "portable physical medium", such as a flexible disk (FD), a CD-ROM (Compact-Disk Read-Only Memory), a DVD (Digital Versatile Disk), a magneto-optical disk, or an IC (Integrated Circuit) card inserted to the computer 110; a "fixed physical medium", such as an HDD (Hard Disk Drive) internally or externally provided to the computer 110; or "another computer (or server)" connected to the computer 110 via a public circuit, the Internet, a LAN (Local-Area Network), or a WAN (Wide-Area Network), and may be read by the computer 110 therefrom for execution.

According to the performance evaluation simulation apparatus disclosed in the present application, effects can be achieved such that SW/HW division can be optimally performed at the initial stage of designing and the validity of SW/HW division can be determined.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A performance evaluation simulation apparatus that evaluates performance by performing a simulation on a software model and a hardware model in which a process to be performed is provisionally determined by using software and hardware from specifications of a system, the performance evaluation simulation apparatus comprising:
a processor including
a basic-process-unit dividing unit that divides the process into basic process units, which are execution units of the process to be performed in the software model based on an execution log that represents execution history obtained by executing the software model on an actual machine or simulation software;
a throughput calculating unit that calculates a throughput of each of the basic process units obtained through division by the basic-process-unit dividing unit, from the number of instruction address strings or the number of address strings for data access kept in the execution log;
an arrangement-structure changing unit that compares each throughput calculated by the throughput calculating unit and a predetermined threshold and changes an arrangement structure so that a basic process unit with a throughput exceeding the predetermined threshold is changed from the software model to the hardware model;

a statistical-information generating unit that generates statistical information on which performance evaluation is based by performing a performance evaluation simulation on the basic process unit whose arrangement structure has been changed by the arrangement-structure changing unit to the hardware model and basic process units arranged in the software model, the performance evaluation simulation executing a bus access via an instruction cache and a data cache, to measure data required for operation analysis of the system; and a determination-condition setting unit that sets a target processor load factor or a bus occupancy by the target processor for determining the performance evaluation result of the target processor on which the performance evaluation simulation is to be performed, wherein the arrangement-structure changing unit, when the statistical information obtained after the performance evaluation simulation is performed does not satisfy the target processor load factor or the bus occupancy by the target processor set by the determination-condition setting unit, changes the predetermined threshold, compares the throughput calculated by the throughput calculating unit and the changed predetermined threshold, and changes an arrangement structure so that a basic process unit with a throughput exceeding the predetermined threshold is changed from the software model to the hardware model.

2. The performance evaluation simulation apparatus according to claim 1, wherein the statistical-information generating unit generates statistical information on which performance evaluation is based by performing the performance evaluation simulation a predetermined number of times on the basic process unit whose arrangement structure has been changed by the arrangement-structure changing unit to the hardware model and basic process units arranged in the software model, the performance evaluation simulation executing the bus access via the instruction cache and the data cache, to measure the data required for operation analysis of the system.

3. The performance evaluation simulation apparatus according to claim 1, wherein the basic process unit is formed of a first block and a second block, the first block having described therein a function unique to each basic process unit according to a process handling unit with combination of plurality of basic process units, and the second block where a process for collecting the statistical information is performed, and in a process handling in combination of a plurality of the basic process units whose arrangement structure has been changed by the arrangement-structure changing unit to the hardware model and the basic process units arranged in the software model, the statistical-information generating unit generates statistical information on which performance evaluation is based by calling the second block upon execution of the function unique to each basic process unit from the first block, exerting a load on the process handling in the called second block, the performance evaluation simulation executing the bus access via the instruction cache and the data cache, to measure the data required for operation analysis of the system.

4. The performance evaluation simulation apparatus according to claim 1, wherein the processor further including a determination-condition setting unit that sets a determination condition for determining the performance evaluation result of a target processor on which the performance evaluation simulation is to be performed, wherein the throughput calculating unit calculates a throughput of a process handling unit in combination of a plurality of the basic process units obtained through division by the basic-process-unit dividing unit, from the number of instruction address strings or the number of address strings for data access kept in the execution log, when the statistical information obtained after the performance evaluation simulation is performed does not satisfy the determination condition set by the determination-condition setting unit, the arrangement-structure changing unit changes the predetermined threshold, compares the throughput calculated by the throughput calculating unit and the changed predetermined threshold, and changes an arrangement structure so that a basic process unit with a throughput exceeding the predetermined threshold is changed from the software model to the hardware model, and the statistical-information generating unit generates statistical information on which performance evaluation is based by performing the performance evaluation simulation on the process handling unit whose arrangement structure has been changed by the arrangement-structure changing unit to the hardware model and the process handling units arranged in the software model, the performance evaluation simulation executing the bus access via the instruction cache and the data cache, to measure the data required for operation analysis of the system.

5. The performance evaluation simulation apparatus according to claim 1, wherein the predetermined threshold for use in the arrangement-structure changing unit is determined based on the performance evaluation results for each of the basic process units calculated from the statistical information obtained from the statistical-information generating unit and a file size of the execution log of the basic process unit, and the arrangement-structure changing unit compares the throughput calculated by the throughput calculating unit and the predetermined threshold determined and changes the arrangement structure of the basic process unit with the throughput exceeding the predetermined threshold from the software model to the hardware model.

6. The performance evaluation simulation apparatus according to claim 1, wherein a second performance evaluation simulation apparatus is disposed that has functions similar to those of the performance evaluation simulation apparatus that evaluates performance by performing a simulation on the software model and the hardware model in which a process to be performed is provisionally determined by using the software and the hardware from the specifications of the system, and the arrangement-structure changing unit compares the throughput calculated by the throughput calculating unit and the predetermined threshold, and changes the arrangement structure so that the basic process unit with the throughput exceeding the predetermined threshold is disposed in the second performance evaluation simulation apparatus.

7. A performance evaluation simulation method for evaluating performance by performing a simulation on a software model and a hardware model in which a process to be performed is provisionally determined by using software and hardware from specifications of a system, the performance evaluation simulation method comprising:

dividing the process into basic process units, which are execution units of the process to be performed in the software model based on an execution log that represents execution history obtained by executing the software model on an actual machine or simulation software;

calculating a throughput of each of the basic process units obtained through the division, from the number of instruction address strings or the number of address strings for data access kept in the execution log;

comparing each of the calculated throughputs and a predetermined threshold;

changing an arrangement structure so that a basic process unit with a throughput exceeding the predetermined threshold is changed from the software model to the hardware model;

generating statistical information on which performance evaluation is based by performing a performance evaluation simulation on the basic process unit whose arrangement structure has been changed by the changing to the hardware model and basic process units arranged in the software model, the performance evaluation simulation executing a bus access via an instruction cache and a data cache, to measure data required for operation analysis of the system;

setting a target processor load factor or a bus occupancy by the target processor for determining the performance evaluation result of the target processor on which the performance evaluation simulation is to be performed;

when the statistical information obtained after the performance evaluation simulation is performed does not satisfy the set target processor load factor or the set bus occupancy by the target processor, changing the predetermined threshold;

comparing the calculated throughput and the changed predetermined threshold; and changing an arrangement structure so that a basic process unit with a throughput exceeding the changed predetermined threshold is changed from the software model to the hardware model.

8. An electronic apparatus including a performance evaluation simulation apparatus that performs a simulation on a process executed on software and hardware from specifications of a system and designs a Large Scale Integration (LSI) based on performance evaluations obtained by the performance evaluation simulation apparatus, the electronic apparatus comprising:

a processor including
an accepting unit that accepts a software model and a hardware model;
a basic-process-unit dividing unit that divides the process into basic process units, which are execution units of process to be performed in the software model based on an execution log that represents execution history obtained by executing the software model on an actual machine or simulation software;
a throughput calculating unit that calculates a throughput of each of the basic process units obtained through division by the basic-process-unit dividing unit, from the number of instruction address strings or the number of address strings for data access kept in the execution log;
an arrangement-structure changing unit that compares each throughput calculated by the throughput calculating unit and a predetermined threshold and changes an arrangement structure so that a basic process unit with a throughput exceeding the predetermined threshold is changed from the software model to the hardware model; and
a statistical-information generating unit that generates statistical information on which performance evaluation is based by performing a performance evaluation simulation on the basic process unit whose arrangement structure has been changed by the arrangement-structure changing unit to the hardware model and basic process units arranged in the software model, the performance evaluation simulation executing a bus access via an instruction cache and a data cache, to measure data required for operation analysis of the system;
a determination-condition setting unit that sets a target processor load factor or a bus occupancy by the target processor for determining the performance evaluation result of the target processor on which the performance evaluation simulation is to be performed; and
an LSI generating unit that implements the software and the hardware on the LSI in a division manner based on the statistical information generated by the statistical-information generating unit,
wherein the arrangement-structure changing unit, when the statistical information obtained after the performance evaluation simulation is performed does not satisfy the target processor load factor or the bus occupancy by the target processor set by the determination-condition setting unit, changes the predetermined threshold, compares the throughput calculated by the throughput calculating unit and the changed predetermined threshold, and changes an arrangement structure so that a basic process unit with a throughput exceeding the predetermined threshold is changed from the software model to the hardware model.

* * * * *